United States Patent
Wieczorek et al.

(10) Patent No.: US 8,448,143 B2
(45) Date of Patent: May 21, 2013

(54) SYSTEM AND METHOD FOR MESSAGE CHOREOGRAPHIES OF SERVICES

(75) Inventors: Sebastian Wieczorek, Mainz (DE); Andreas Roth, Karlsruhe (DE); Alin Stefanescu, Gross-Zimmern (DE); Anis Charfi, Darmstadt (DE); Frank Michael Kraft, Speyer (DE)

(73) Assignee: SAP AG, Walldorf (DE)

( * ) Notice: Subject to any disclaimer, the term of this patent is extended or adjusted under 35 U.S.C. 154(b) by 1158 days.

(21) Appl. No.: 12/338,183

(22) Filed: Dec. 18, 2008

(65) Prior Publication Data

US 2010/0162213 A1 Jun. 24, 2010

(51) Int. Cl.
*G06F 9/44* (2006.01)
*G06F 17/00* (2006.01)
*G06F 15/16* (2006.01)

(52) U.S. Cl.
USPC .......... 717/126; 717/100; 717/104; 717/107; 717/120; 705/400; 709/219

(58) Field of Classification Search
None
See application file for complete search history.

(56) References Cited

U.S. PATENT DOCUMENTS

| | | | | |
|---|---|---|---|---|
| 6,160,907 A * | 12/2000 | Robotham et al. | ............ | 715/246 |
| 7,340,508 B1 * | 3/2008 | Kasi et al. | ............ | 709/219 |
| 8,327,319 B2 * | 12/2012 | Moosmann et al. | ............ | 717/104 |
| 2007/0150387 A1 * | 6/2007 | Seubert et al. | ............ | 705/31 |
| 2007/0162893 A1 * | 7/2007 | Moosmann et al. | ............ | 717/121 |
| 2007/0168303 A1 * | 7/2007 | Moosmann et al. | ............ | 705/400 |
| 2007/0174811 A1 * | 7/2007 | Kaetker et al. | ............ | 717/104 |
| 2007/0186209 A1 * | 8/2007 | Kaetker et al. | ............ | 717/104 |
| 2007/0234282 A1 * | 10/2007 | Prigge et al. | ............ | 717/107 |
| 2008/0021754 A1 * | 1/2008 | Horn et al. | ............ | 705/8 |
| 2008/0263503 A1 * | 10/2008 | Polly et al. | ............ | 717/100 |
| 2009/0019428 A1 * | 1/2009 | Li et al. | ............ | 717/128 |
| 2009/0150866 A1 * | 6/2009 | Schmidt | ............ | 717/120 |

OTHER PUBLICATIONS

Howard Foster et al., Model-Based Analysis of Obligations in Web Services Choreography , 2006 IEEE, 0-7695-2522-9/06, [Retrieved on Aug. 20, 2012]. Retrieved from the internet: <URL: http://ieeexplore.ieee.org/xpls/abs_all.jsp?arnumber=1602282> 8 Pages (1-8).*

Jing Li et al., Modeling and Verifying Web Services Choreography Using Process Algebra , 2007 IEEE, [Retrieved on Aug. 20, 2012]. Retrieved from the internet: <URL: http://ieeexplore.ieee.org/xpls/abs_all.jsp?arnumber=4402784> 10 Pages (256-268).*

Chris Peitz, Web Services Orchestration and Choreography, IEEE 2003, [Retrieved on Feb. 1, 2013]. Retrieved from the Internet: <URL: http://ieeexplore.ieee.org/stamp/stamp.jsp?tp=&arnumber=1236471> 7 Pages (46-52).*

(Continued)

*Primary Examiner* — Don Wong
*Assistant Examiner* — Anibal Rivera
(74) *Attorney, Agent, or Firm* — Fountainhead Law Group PC

(57) ABSTRACT

A computer-implemented method of evaluating interactions between processes. The method includes storing a message choreography meta-model that includes an interaction meta class and a constraint meta-class. A user creates a message choreography model between a first process and a second process. The method further includes executing a verification computer program that performs a verification of the message choreography model. The verification includes verifying absence of an inconsumable message.

20 Claims, 16 Drawing Sheets

OTHER PUBLICATIONS

Hongli Yang et al., A Formal Model for Web Service Choreography Description Language (WS-CDL), IEEE 2006, [Retrieved on Feb. 1, 2013]. Retrieved from the internet: <URL: http://ieeexplore.ieee.org/stamp/stamp.jsp?tp=&arnumber=4032109> 2 Pages (1-2).*

Sinuhe Arroyo et al., A model-driven choreography conceptual framework, 2007, [Retrieved on Feb. 1, 2013]. Retrieved from the internet: <URL: http://www.sciencedirect.com/science/article/pii/S0920548906000699#> 10 Pages (325-334).*

Rajeev Alur, Kousha Etessami, Mihalis Yannakakis, "Realizability and verification of MSC graphs." In: Theoretical Computer Science (TCS), vol. 331(1), pp. 97-114. Elsevier (2005).

Benedetto, C., "SOA and integration testing: The end-to-end view." In: SOA World Magazine 6(8), (2006).

Bultan, T., Fu, X: Specification of Realizable Service Conversations Using Collaboration Diagrams. In: Service Oriented Computing and Applications, vol. 2, No. 1, pp. 27-39. Springer (2008).

Business Process Modeling Notation (BPMN) Specification, OMG Final Adopted Specification, Technical Report, Feb. 2006, retrieved from: http://www.bpmn.org.

Gero Decker, Oliver Kopp, Frank Leymann, Mathias Weske, "BPEL4Chor: Extending BPEL for Modeling Choreographies," In International Conference on Web Services Oriented Computing (ICWS'07), pp. 296-303. IEEE Computer Society (2007).

Gero Decker, Mathias Weske, "Behavior Consistency for B2B Process Integration," In Proc. of CAiSE'07, LNCS, vol. 4495, pp. 81-95, Springer, 2007.

Gero Decker, Mathias Weske, "Local Enforceability in Interaction Petri Nets," Hasso-Plattner-Institute, University of Potsdam, Germany, 2007.

Xiang Fu, Tevfik Bultan, Jianwen Su, "Conversatioin Protocols: A Formalism for Specification and Verification of Reactive Electronic Services," In Theoretical Computer Science (TCS), vol. 328(1-2), pp. 19-37, Elsevier (2004).

W3C, "Web Services Choreography Description Language Version 1.0" Nickolas Kavantzas, David Burdett, Gregory Ritzinger, Tony Fletcher, Yves Lafon, Charlton Barreto, Eds., Nov. 9, 2005, retrieved from: http://www.w3.org/TR/ws-cdl-10/, printed on Dec. 8, 2008.

Metayer, C., Abrial, J.R., Voisin, L., "Event-B Language", Chapter 2. Online at: http://rodin.cs.ncl.ac.uk Oct. 30, 2007.

Sap AG, Enterprise SOA in a Nutshell. (2007), Online at: http://help.sap.com/redirect_sdn_esoa/redirect_esoainanutshell.htm.

W.M.P. Van Der Aalst, M. Weske, "The P2P Approach to Interorganizational Workflows". In: Proc. of CAiSE'01. LNCS, vol. 2068, pp. 140-156. Springer (2001).

S. Wieczorek, A. Roth, A. Stefanescu, A. Charfi, "Precise Steps for Choreography Modeling for SOA Validation and Verification." In: International Symposium on Service-Oriented Software Engineering (SOSE'08). IEEE Computer Society (2008).

S. Wieczorek, A. Stefanescu, M. Fritzsche, J. Schnitter, Enhancing Test Driven Development with Model Based Testing and Performance Analysis. In: Testing: Academic & Industrial Conference—Practice and research techniques (TAICPART'08), pp. 82-86. IEEE Computer Society (2008).

S. Wieczorek, A. Stefanescu, J. Grossmann, "Enabling model-based testing for SOA integration testing." In: Proc. of 1st "Model-based testing in practice" workshop (MOTIP'08), pp. 77-82. Fraunhofer IRB Verlag (2008).

Web Service Glossary, Version 20040211, W3C. Online at: http://www.w3.org/TR/ws-gloss/ Feb. 2004.

Web Services Reliable Messaging (WS-ReliableMessaging), Version 1.1. OASIS Consortiom. Online at: http://docs.oasis-open.org/ws-rx/wsrm/v1.1/wsrm.pdf Jan. 7, 2008.

J.M. Zaha, M. Dumas, A. Ter Hofstede, A. Barros, G. Decker, "Service interaction modeling: bridging global and local views." In Proc. of Enterprise Distributed Object Computing Conf. (EDOC'06), IEEE Computer Society, pp. 45-55. 2006.

Johannes Maria Zaha, Alistair Barros, Marlon Dumas, Arthur ter Hofstede, "Let's Dance: A Language for Service Behavior Modeling," Lecture Notes in Computer Science, 4275, pp. 145-162, 2006.

S. Wieczorek, A. Stefanescu, and I. Schieferdecker "Test data provision for ERP systems", In Proc. of Int. Conf. on Software Testing, Verification and Validation (ICST'08), IEEE Computer Society, 2008, pp. 396-403.

A. Barros, M. Dumas, A. Ter Hofstede, "Service interaction patterns", In Proc. of Int. Conf. on Business Process Management (BPM'05), Springer, 2005, pp. 302-318.

G. Decker and A. Barros, "Interaction modeling using BPMN," In Proc. of Business Process Management Workshop 2007 (BPM'07), LNCS 4928, Springer, 2007, pp. 208-219.

R. Lai, "A survey of communication protocol testing," Journal of Systems and Software 62(1), 2002, pp. 21-46.

G. Pike, "Supporting business innovation while reducing technology risk," SAP Insight, Jun. 2006. Online at: http://www.sap.com/services/programs/pdf/BWP_Supporting_Business_Innovation.pdf.

* cited by examiner

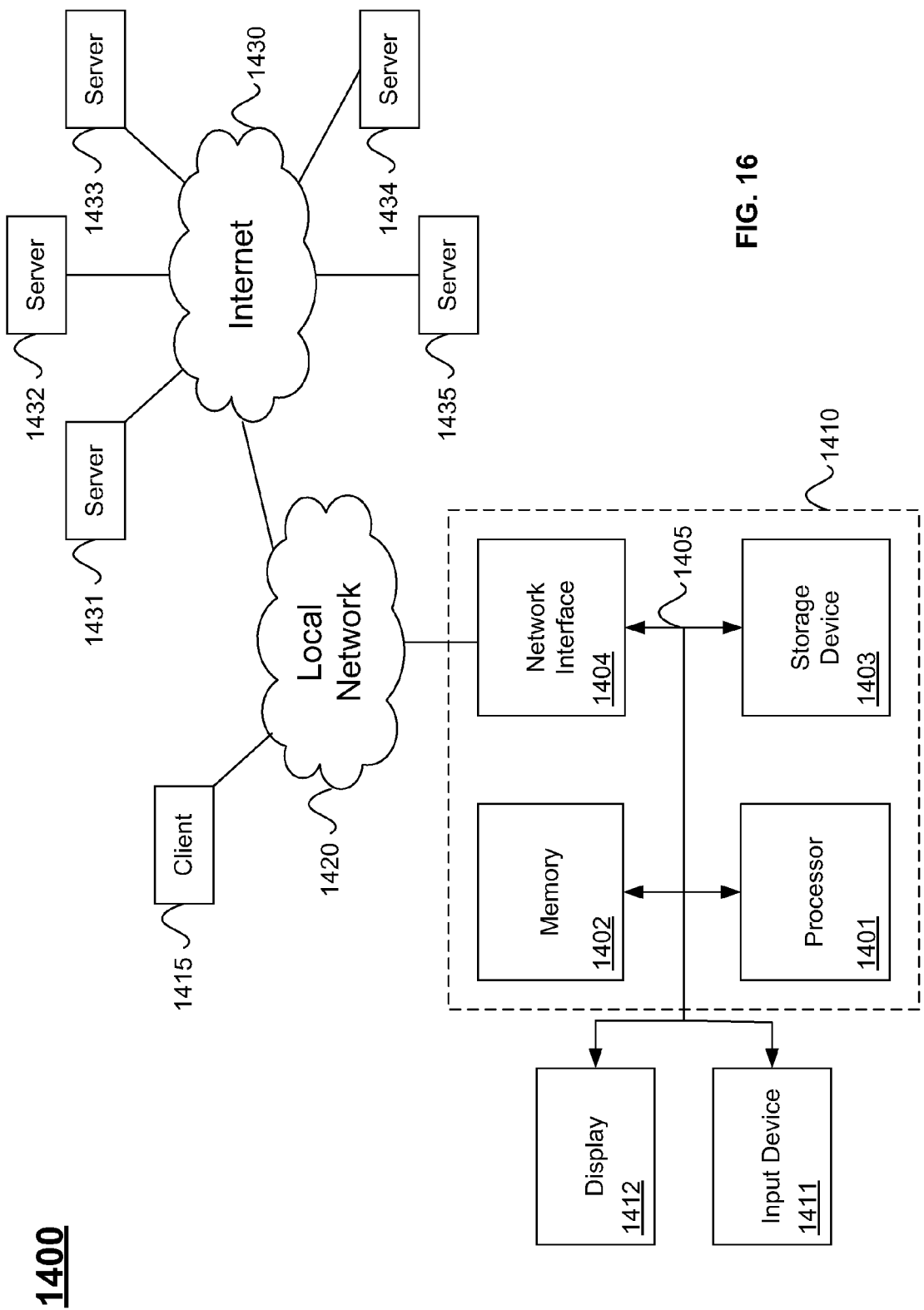

SYSTEM AND METHOD FOR MESSAGE CHOREOGRAPHIES OF SERVICES

CROSS REFERENCE TO RELATED APPLICATIONS

Not Applicable.

BACKGROUND

The present invention relates to service coordination, and in particular, to modeling service interactions as message choreographies.

Unless otherwise indicated herein, the approaches described in this section are not prior art to the claims in this application and are not admitted to be prior art by inclusion in this section.

Enterprise Resource Planning (ERP) software supports business processes for whole companies, with SAP AG being a leading provider of ERP software. ERP software integrates many organizational parts and functions into one logical software system, posing unique challenges to software development and especially testing. Such software systems are typically very complex. Service-oriented architecture (SOA) is regarded as a next evolutionary step to cope with the software complexity of ERP systems where monolithic approaches are not applicable anymore. SAP makes it easy to adopt SOA by delivering SOA-enabled software, SOA methodology guidelines, and professional services. In SAP's approach, independent business components exhibit enterprise services that can be composed individually to implement customized business processes. For this service integration, which takes place on a higher level of abstraction than component development, we observed several complex service interactions.

To address the complexity of those interactions, choreography languages have emerged. According to the W3C Web Service Glossary, "a choreography defines the sequence and conditions under which multiple cooperating independent agents exchange messages in order to perform a task to achieve a goal state". A choreography describes the interaction protocol from the perspective of a global observer between a set of loosely coupled components communicating over message channels.

Choreography models play an important role in SOA development and can provide a basis for ensuring quality over three use cases: design, verification and testing.

Several choreography modeling languages have emerged in the last few years. They vary in several regards such as abstraction level, formal grounding, target users, etc. Some of the most prominent languages include WS-CDL (Web Services Choreography Description Language), BPMN (Business Process Modeling Notation), BPEL4Chor and Let's Dance.

WS-CDL is a choreography language that targets the implementation level and builds on WSDL. It uses an XML-based textual syntax and allows the specification of message types, guards and conditions. It is formal as it is based on the Global Calculus.

BPMN, BPEL4Chor and Let's Dance focus on high-level service interaction modeling in early design phases and targets business analysts.

Other modeling constructs have been proposed for choreography modeling, such as Petri-nets, message sequence charts and communicating state machines. Like BPMN, BPEL4Chor and Let's Dance they are able to specify either global or stitched local choreography models.

Through evaluation, it was observed that these choreography languages do not simultaneously fulfill some noteworthy requirements regarding the software development activities of design, verification and testing. This is mainly due to high abstraction level, imprecise semantics, lack of a formal foundation, assumption of ideal channels, lack of termination symbols, lack of racing detection during message exchange, etc. This means that various models have to be created for each use case using different languages, which is not very efficient on a large industrial scale and further may lead to inconsistencies between the various models.

SUMMARY

Embodiments of the present invention improve the efficiency of service design, verification and testing via message choreography modeling. In one embodiment, a computer program implements a tool to describe and verify (the possibly asynchronous) message exchange between autonomous service components. (e.g., service choreography).

In one embodiment the present invention includes a computer-implemented method of evaluating interactions between processes. The method includes storing a message choreography meta-model that includes an interaction meta class and a constraint meta-class. The interaction meta-class relates to an exchange of a message between a sender and a receiver, and the constraint meta-class relates to an input to the interaction meta-class. The method further includes executing a user interface computer program with which a user creates a message choreography model between a first process and a second process. The message choreography model is based on the message choreography meta-model. The message choreography model includes interactions that conform to the interaction meta class, and includes constraints that conform to the constraint meta class. The method further includes executing a verification computer program that performs a verification of the message choreography model. The verification includes verifying absence of an inconsumable message. The method further includes executing a testing computer program that performs a testing based on the message choreography model. The testing validates on an existing implementation the message exchange execution described by the choreography.

According to an embodiment, a computer program implements the method described above.

According to an embodiment, a computer system executes the computer program that implements the method described above.

The following detailed description and accompanying drawings provide a better understanding of the nature and advantages of the present invention.

BRIEF DESCRIPTION OF THE DRAWINGS

FIG. 16 is a block diagram of an example computer system and network 1400 for implementing embodiments of the present invention.

DETAILED DESCRIPTION

Described herein are techniques for improving the efficiency of computer implemented services. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

1. INTRODUCTION

Complex service interactions are at the center of service-based process integration. Therefore it is useful to have a formal specification of the interaction protocols between the interacting services. Such a specification may not only provide an accurate contractual basis between services, but may also enable automated verification and testing. Current choreography languages do not support these two development tasks simultaneously. To address that issue, the present application describes a choreography modeling approach called Message Choreography Modeling (MCM), which provides a unifying framework for design, formal verification, and test generation. These three tasks may use the same model, taking different views and communication channel assumptions into account. The syntax and semantics of the proposed language are defined, and an editor is presented with supporting tools for verification and testing.

In this application is presented a choreography modeling approach called Message Choreography Modeling (MCM) including a language (that satisfies requirements such as graphical state-based representation, explicit concurrency, detailed message types, local viewpoints, determinism, a distinction between global and local constraints) and the implemented editor with verification and testing plugins. We define the syntax and semantics of that language and explain how choreography models in that language support the use cases.

Figure 1A:
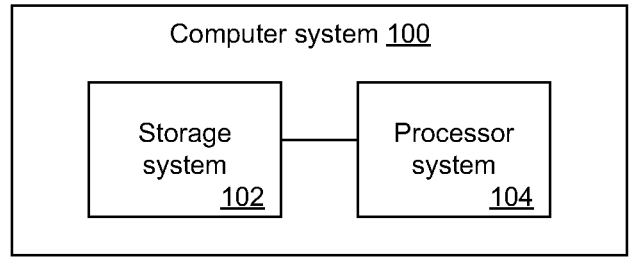
FIGS. 1A-1B are block diagrams of a computer system and a computer program, respectively, according to embodiments of the present invention.
Figure 1B:
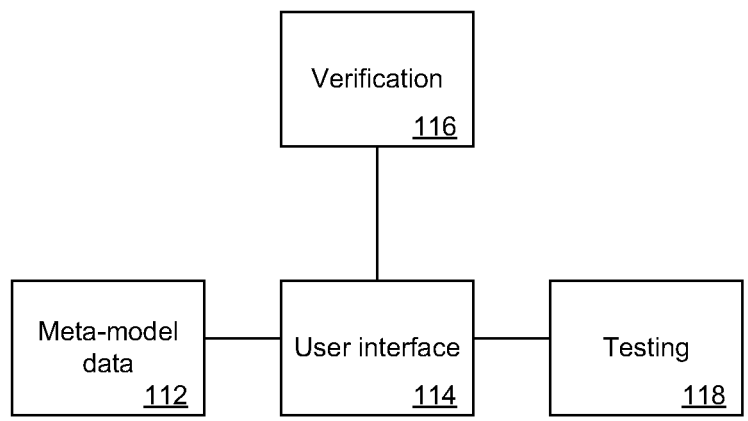

FIGS. 1A-1B are block diagrams of a computer system 100 and a computer program 110, respectively, according to embodiments of the present invention. FIG. 1A shows that the computer system 100 includes a storage system 102 and a processor system 104. FIG. 1B shows that the computer program 110 includes meta-model data 112, a user interface computer program 114, a verification computer program 116, and a testing computer program 118. The computer program 110 may be executed by the computer system 100. The operation of the computer system 100 and the computer program 110 is described below with reference to FIG. 2.

Figure 2:
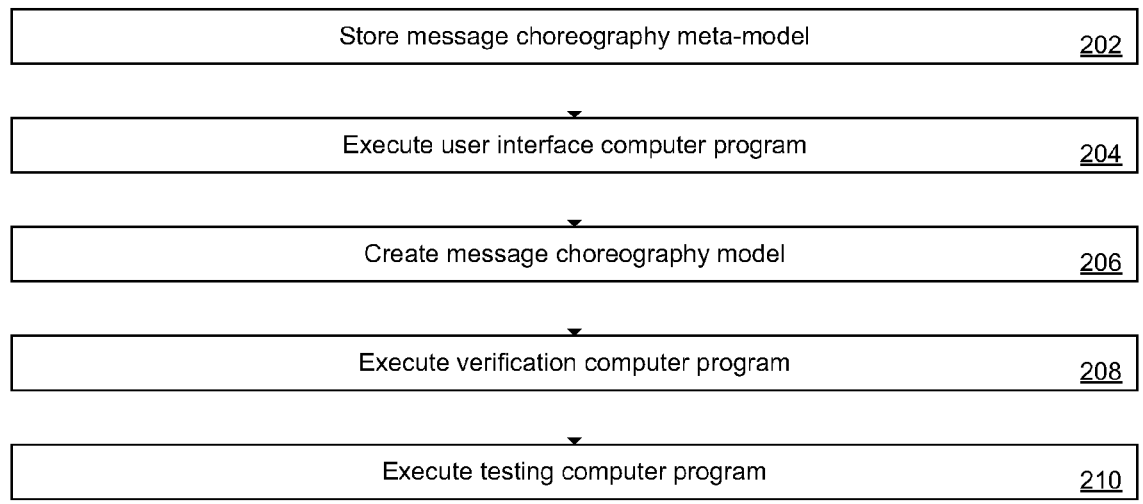
FIG. 2 is a flowchart of a method 200 of evaluating interactions between processes, according to an embodiment of the present invention.

FIG. 2 is a flowchart of a method 200 of evaluating interactions between processes, according to an embodiment of the present invention. The method 200 may be implemented by the computer program 110 or performed by the computer system 100.

In step 202, a message choreography meta-model is stored. The storage system 102 may store the message choreography meta-model. The meta-model data 112 may correspond to the message choreography meta-model. The message choreography meta-model includes an interaction meta class and a constraint meta-class. The interaction meta-class relates to an exchange of a message between a sender and a receiver. The constraint meta-class relates to an input to the interaction meta-class.

In step 204, the user interface computer program 114 is executed. The processor system 104 may execute the user interface computer program 114.

In step 206, a user uses the user interface computer program 114 to create a message choreography model between a first process and a second process. The user may interact with the computer system 100 to use the user interface computer program 114. The message choreography model is based on the message choreography meta-model. The message choreography model includes a number of interactions that conform to the interaction meta-class, and a number of constraints that conform to the constraint meta-class.

In step 208, the verification computer program 116 is executed. The processor system 104 may execute the verification computer program 116. The verification computer program 116 performs a verification of the message choreography model. The verification includes verifying absence of inconsumable messages. Alternatively, if the verification computer program 116 detects an inconsumable message, the verification computer program 116 reports that verification has failed.

In step 210, the testing computer program 118 is executed. The processor system 104 may execute the testing computer program 118. The testing computer program 118 performs a testing based on the message choreography model. According to an embodiment, the testing performs model based testing on the existing implementation of the choreography by executing the test cases that the testing computer program 118 generates from the message choreography model. According to an embodiment, the testing validates on an existing implementation the message exchange execution described by the choreography.

The computer system 100 may include one or more physical computing devices, each with their own storage system and processor system, that are connected via a network. Further details regarding the computer system 100, the computer program 110 and the method 200 are provided below.

2. MOTIVATION

Figure 3A:
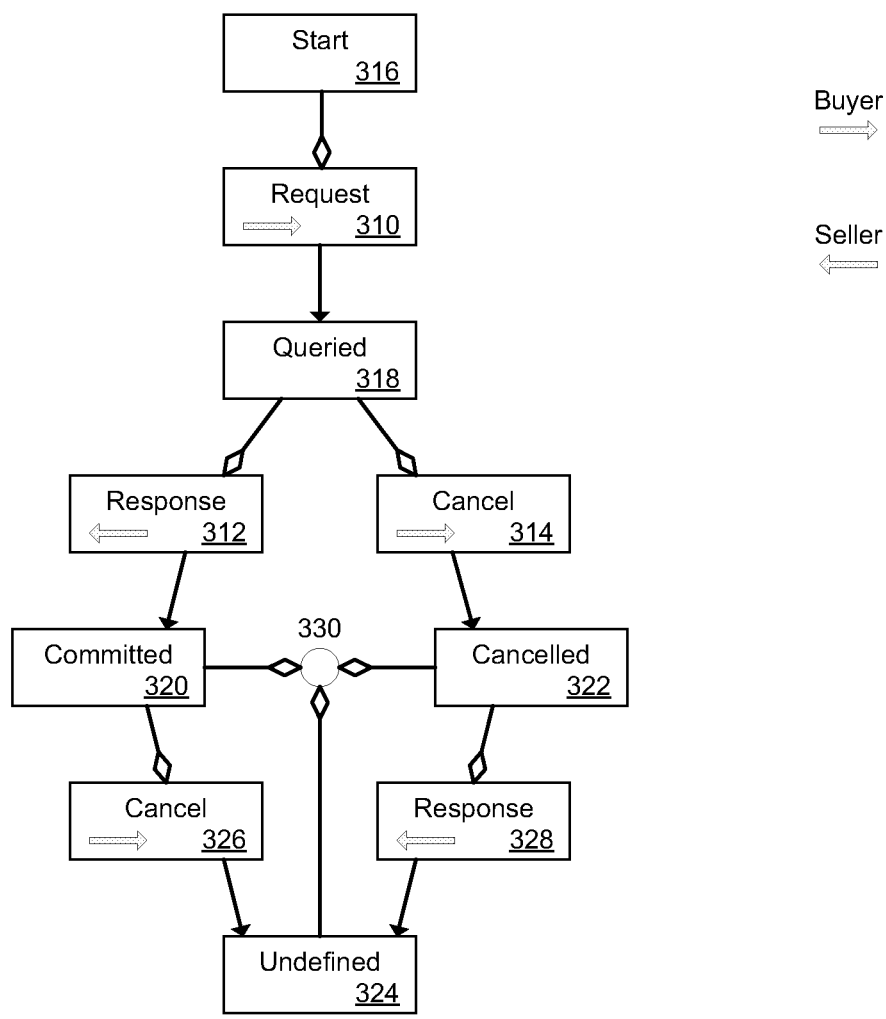
FIGS. 3A-3B are flow diagrams that introduce a running example and motivate the use cases, according to an embodiment of the present invention.
Figure 3B:
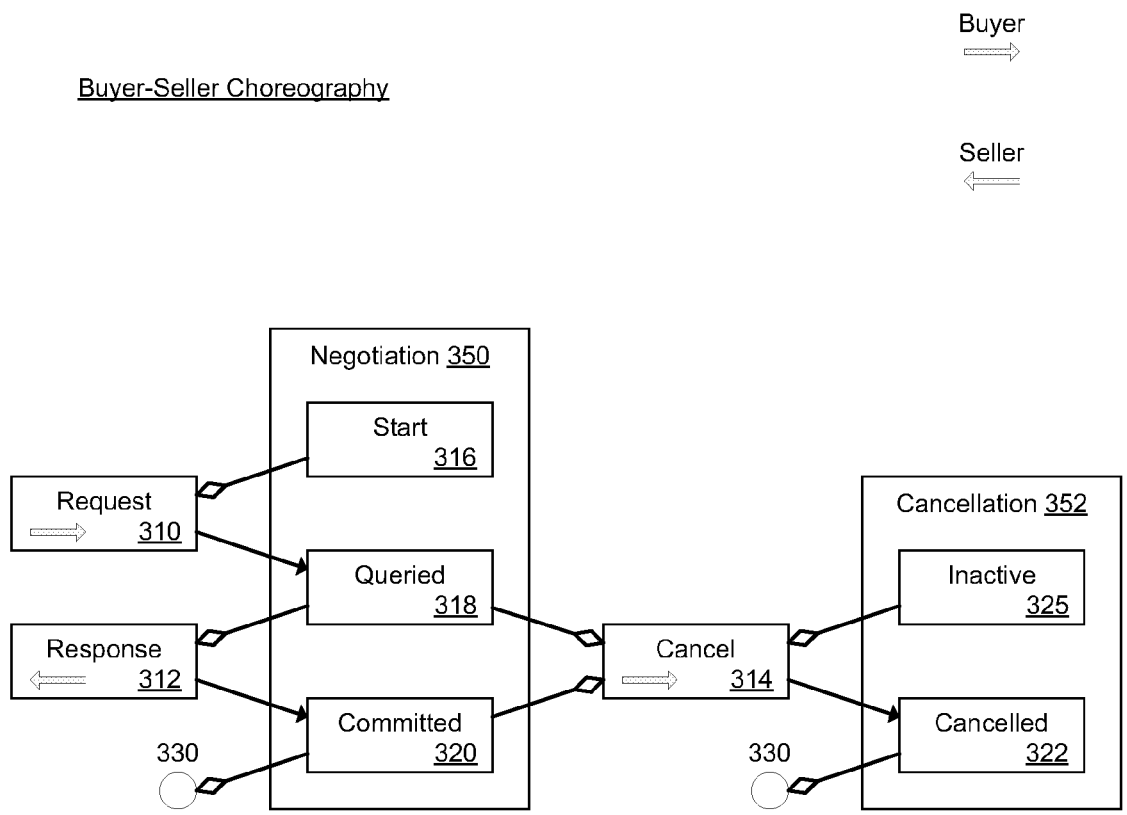

FIGS. 3A-3B are flow diagrams that introduce a running example and motivate the use cases, according to an embodiment of the present invention. FIG. 3A shows a choreography 302 between a buyer and a seller. FIG. 3B shows a parallelization 304 of the choreography 302 of FIG. 3A.

The buyer requests a certain product using a request message 310. Consequently, either the seller accepts the order by sending the response message 312 or the buyer stops the transaction by sending a cancel message 314. The current state of the conversation is represented by the start state 316, the queried state 318, the committed state 320, the cancelled state 322, and the undefined state 324. (The undefined state 324 is reached when the buyer sends the cancellation message 326 after the committed state 320, or when the seller sends the response message 328 after the cancelled state 322.) The arrows on the messages define the sender of the message: left-to-right for the buyer and right-to-left for the seller. The circle 330 in the center marks the valid end states of the conversation. Note that buyer and seller roles are not explicitly depicted, but are implicitly derived based on the message types. Fuller details regarding the semantics of the models is given in Section 3.

Even though the presented protocol provides a high-level business view of the process, some semantical subtleties may be considered if the protocol is used for testing or verification: Does this description specify a subset of the intended behavior, which may allow additional transitions (e.g. observing a new request message in the state committed), or does it describe a maximal allowed behavior, such that conformant implementations are allowed to leave out some functionality like not sending a response after a cancel? Moreover, the semantics of message sending and receiving may be defined based on the specific channel assumptions. Having a precise semantics choreography model can support diverse means of quality control:

Collaborative development. In contrast to traditional method calls, the encapsulation provided by services in SOA is much coarser making detailed knowledge about the communication steps necessary. In the example of FIGS. 3A-3B, it is important to know whether a cancellation is still possible after the buyer received a response message or if this is completely forbidden. An unambiguous choreography model therefore facilitates a correct implementation in an environment where distributed teams are working independently. Further it documents the design decisions made by integration architects and enables model based techniques that are indispensable for a holistic development approach.

Verification. Formal techniques like deductive verification or model checking make it possible to verify properties of choreography models like functional correctness, deadlock freedom, or local enforceability. For reliable verification results, service choreographies may formally describe all the allowed behavior (see Section 3). Moreover, the verification analysis for safety properties usually relies on over-approximations of the behavior, i.e. the model describes more ways of interaction than the application offers in reality.

Testing. Formalized service choreographies enable model-based testing (MBT) of service integration in SOA applications. An over-approximation semantics of the choreography model however may lead to the generation of infeasible test cases. In the example of FIGS. 3A-3B, it might not be possible to trigger the sending of a cancellation by the buyer after the seller's response has been received. Consequently the test would fail even though the system may behave properly. To mitigate this, MBT relies on under-approximations of the global behavior.

From the discussion above we can deduce that only choreography models that neither incorporate additional nor leave out acceptable behavior enable simultaneously both verification and testing. More precisely, such global models may be equivalent to the observable communication of the local components.

3. OVERVIEW OF THE CHOREOGRAPHY MODELING APPROACH

As mentioned in the introduction, no existing choreography language fulfills all the requirements mentioned in Section 2. Therefore, an embodiment of the present invention is directed toward MCM that simultaneously supports design, verification, and testing. An embodiment implements an Eclipse-based editor for MCM and includes plug-ins for verification and testing.

According to an embodiment, MCM includes the following models:
 global choreography models specifying a high-level view on the exchanged messages,
 local partner models for each of the involved parties, and
 channel models describing characteristics of the communication channel on which messages are exchanged between the partners.

After defining these models, we will discuss their relationships.

3.1 Global Choreography Model

Syntax. Following the original structure of choreography models as a supra-component view on message exchange, global choreography models (GCMs) according to an embodiment provide a high level view on service interaction. One idea is to abstract from describing "sending" or "receiving" messages and to take the position of an observer between the components. This virtual observer monitors the exchanged messages, but not the activities inside the involved components.

The GCM corresponds to a labeled transition system (LTS) where the transitions are labeled by interactions, i.e. events of observing a message on the channel, and the states are global states of the communication specifying whether a certain message can be exchanged at that stage. To simplify the presentation, the global state space may include a finite set of named states with one distinguished initial state. Note that one implementation according to an embodiment may have a more sophisticated state space (similar to an extended concurrent finite state machine), as described in Section 3.6.

Interactions include four ingredients:
 A message type identified by a unique name.
 The sender and the receiver of the interaction.
 An effect on the global state, i.e. the subsequent global state which is activated when the interaction takes place.
 A guard condition restricting when the interaction is enabled. For now, we assume that the condition only defines in which state the interaction can take place. In Section 3.6 more detailed guard conditions are presented.

End states are global states that describe when the modeled choreography can be terminated, i.e. when it is legal that no further interaction takes place. Note that in some real life scenarios one cannot decide whether a service conversation reached an end state, because one of the participants is able to restart the conversation. This is different from existing choreography languages, where termination means that no further interaction can take place.

A GCM for a set of message types thus includes a set of partners designated as senders or receivers of these message types, a set of states, some of which are marked as initial or as end states, and a set of interactions. FIG. 3A gives an example of a GCM.

In FIG. 3A, the states are the start state 316, the queried state 318, the committed state 320, the cancelled state 322, and the undefined state 324. The start state 316 may also be referred to as the initial state. The interactions correspond to the messages (e.g., 310, 312, 314, 326 and 328) and may be labeled with the message type of the interaction and the direction of message exchange. The outgoing arrows of an interaction represent its effects. For instance, the request message 310 has the effect of reaching the queried state 318. A line that terminates in a rhombus (e.g., from the queried state 318 to the response message 312), connecting an interaction and a state, indicates that the state represents the guard of the interaction. The end states (e.g., 320, 322 and 324) are connected to the circle 330.

Semantics. Given a GCM G, we denote by LTS(G) the labeled transition system of G. The traces of G, denoted by Traces(G), is the set of sequences $(i_1, \ldots, i_n)$ of interactions for which there exists a sequence $(s_0, \ldots, s_n)$ of states such that $s_0$ is initial, for all $k=1, \ldots, n$, $s_{k-1}$ satisfies the guard of $i_k$ and $s_k$ is the effect of $i_k$, and $s_n$ is an end state. Section 3.5 defines more precisely the relation between the atomic interactions of G and their corresponding sending and receiving events.

3.2 Local Partner Model

A local partner model (LPM) focuses on a single component involved in a choreography, describing which messages may be sent and received by that communication partner. Very similar to GCMs, the elements of an LPM include a set of send events, a set of receive events, and a set of named local states with a distinguished initial state. Local end states are a subset of the local states. Similar to the interaction in GCM a send event, or respectively a receive event, includes the message type, the receiving partner (or respectively the sending partner), and the effect and guard defined on the local state space.

Figure 4A:
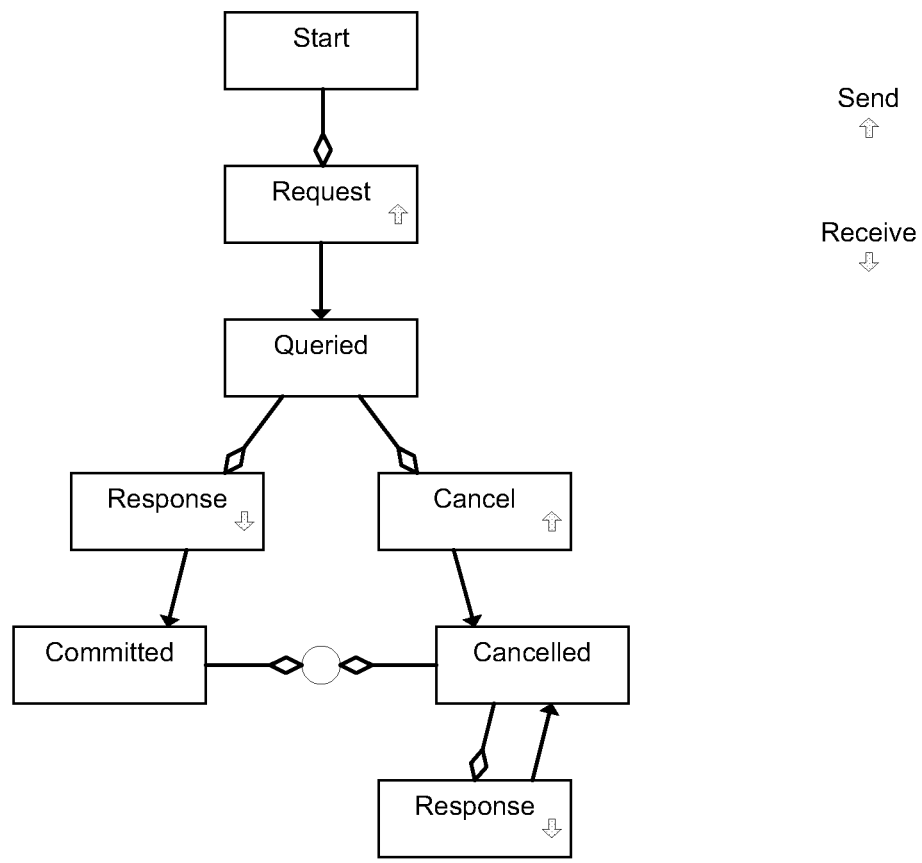
FIGS. 4A-4B give an example of two LPMs according to an embodiment of the present invention.
Figure 4B:
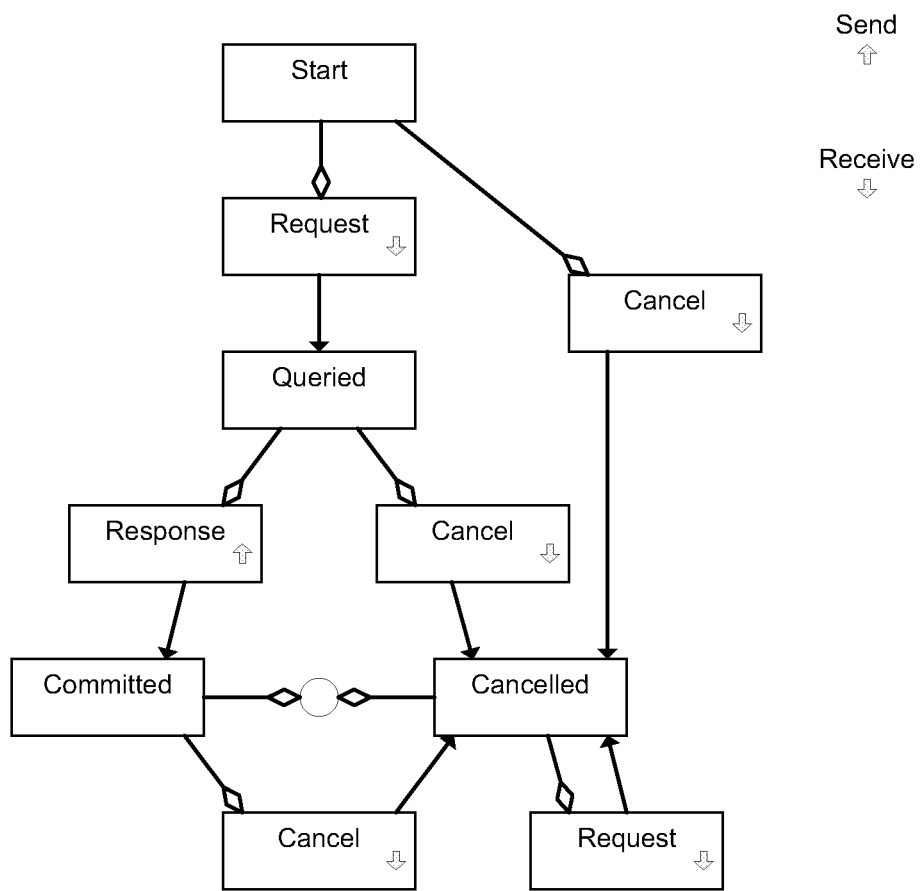

FIGS. 4A-4B give an example of two LPMs according to an embodiment of the present invention. FIG. 4A shows an LPM for the buyer, and FIG. 4B shows an LPM for the seller. The send and receive events are distinguished graphically by upwards or downwards (respectively) pointing arrows. The states and messages shown in FIGS. 4A-4B but not otherwise described may be assumed to be similar to those described above with reference to FIGS. 3A-3B.

3.3 Channel Model

Given a set of message types MT, a channel model is a total function r from a sequence of messages (of MT) to a sequence of messages (of MT). With MT' ⊂ MT and a message sequence s, $\pi_{MT'}(s)$ denotes the projection of s to sequences of the messages of message types MT'. Let $\pi_{MT'}$ be canonically extended on the channel model. The channel model r is then based on assignments of disjoint subsets MT' of MT to channel reliability guarantees which enforce that $\pi_{MT'}(r)$ satisfies certain properties. (In the context of SAP applications, it is common to assign reliability guarantees per message type for the communication between two components.) Typical reliability guarantees, e.g. regulated in the WS-RM standard, are:

exactly once in order (EOIO) where $\pi_{MT'}(r)$ is the identity function on message sequences and exactly once (EO) where $\pi_{MT'}(r)$ is a permutation on a message sequence.

Weaker guarantees, where message loss, modification, or duplication can occur are treated at a lower level in the technology stack, so we do not consider them in the MCM tool. In practice, EO is preferred over EOIO, since it is less costly to enforce.

3.4 Composed System

A composed system includes a set of LPMs and a channel model over some common set of message types. Its state space is defined by the notion of a composed state, which includes a local state of each LPM and a sequence of messages of the system's message types currently sent but not yet received (that means they are on the channel).

Given a composed system L, its labeled transition system denoted by LTS(L) is defined on the composed states and the transitions labeled by send and receive events of the LPMs. The transitions are described in items S2, S3 and S4 below. The behavior of L, denoted by Traces(L), is defined by the sequences $(e_1, \ldots, e_n)$ of send or receive events $e_k$ ($k=1, \ldots, n$) of the LPMs involved in the composed system which satisfy the following property. There is a sequence $(s_0, \ldots, s_n)$ of composed states such that for all $e_i$ ($i=1, \ldots, n$), its message type mt, and its partner p the following items hold:

S1. In $s_0$ the channel is empty and all LPMs are in their initial local states (i.e. composed initial state).

S2. The state of p in $s_{i-1}$ satisfies the guard condition of $e_i$ and the state of p in $s_i$ equals the effect of $e_i$ and $s_{i-1}$ equals $s_i$ in all other partners' states.

S3. If $e_i$ is a send event, then in $s_i$ the channel sequence equals the channel sequence of $s_{i-1}$ prepended with a new message of mt.

S4. Let r be the reliability guarantee assigned to the subset MT of message types with mt Ⓐ MT. Let ch be the sequence of messages on the channel in $s_{i-1}$. If $e_i$ is a receive event, then with $r(ch)=(m_1, \ldots, m_k)$:

$m_k$ is of type mt and the channel sequence of $s_i$ equals r(ch) without its last element $m_k$.

S5. In $s_n$ all reached local states are end states and the channel is empty (i.e. composed end state).

Figure 5:
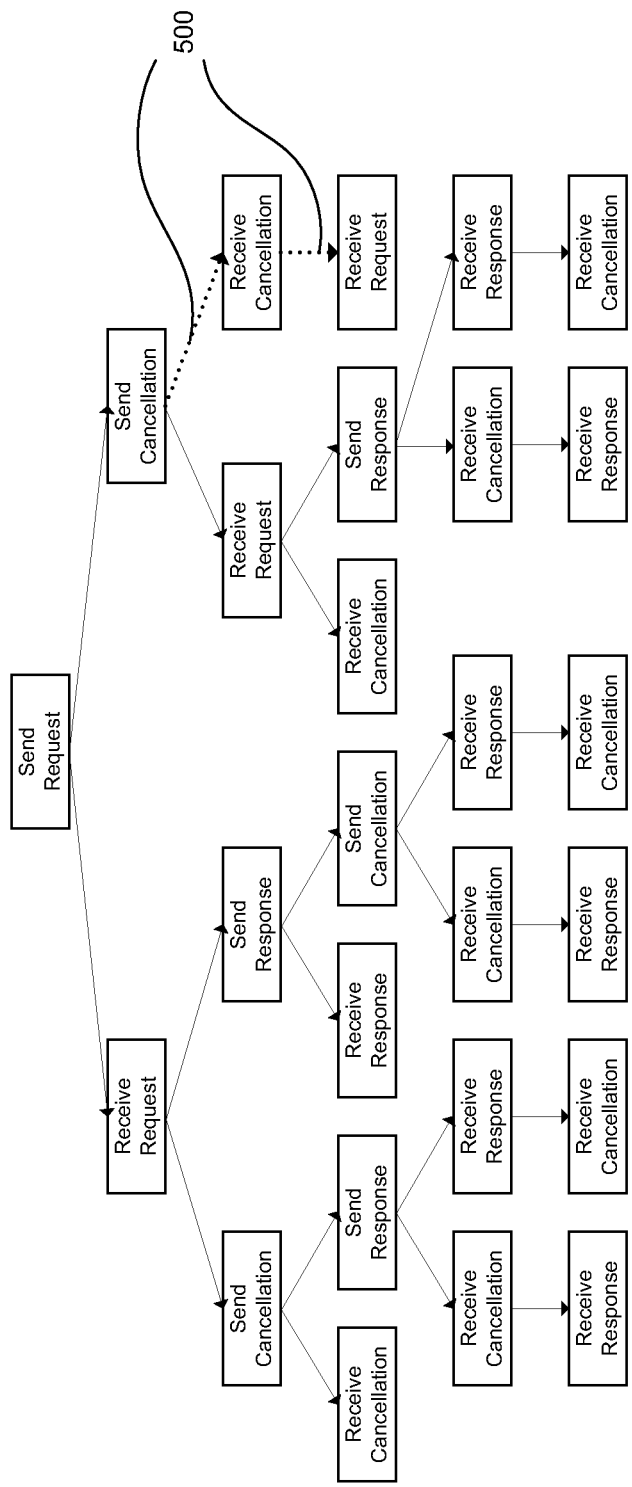
FIG. 5 shows the traces for the composed system of FIGS. 4A-4B with the EO channel assumption, according to an embodiment of the present invention.

FIG. 5 shows the traces for the composed system of FIGS. 4A-4B with the EO channel assumption, according to an embodiment of the present invention. For an EOIO channel, the dashed path 500 is excluded because the request message cannot overtake the cancellation message.

3.5 Consistency Between the Global and Local Models

Given a fixed set of partners and message types, we assume to have a GCM G and composed system L over the given set of partners. With G and L we can associate their labeled transition systems LTS(G) and LTS(L) as well as their traces Traces(G) and Traces(L). Note that while LTS(G) has a finite number of states, LTS(L) may have an infinite number of states if there are no restrictions on the channel size.

Several types of consistency relations between G and L can be then defined taking three dimensions into account: the type of consistency relation, the direction of the consistency relation between G and L, and the viewpoint of the global observer of the choreography.

Regarding the type of relations, we consider either the simulation relation between LTS(G) and LTS(L) or the trace inclusion of Traces(G) and Traces(L). Regarding the direction of the relation, we consider that either L is an over-approximation of G or L is an under-approximation of G or they are equivalent. More precisely for simulation G is an over-approximation of L, if LTS(L) simulates LTS(G) while for trace inclusion Traces(G) c Traces(L). The third dimension is the viewpoint of the choreography which can be of three types: send, receive or observe. Combining the three dimensions we obtain 2×3×3=18 types of consistency relations.

The mentioned consistency relations are simulation and trace inclusion. For simulation, we use the classical simulation relation with termination extension for the end states similar to the one described by Decker and Weske. See Decker, G., Weske, M.: Local Enforceability in Interaction Petri Nets, in Conference on Business Process Management (BPM'07), LNCS, vol. 4714, pp. 305-319, Springer (2007). Informally defined, given two LTSs A and B over the same alphabet of labels, A simulates B if there exists a relation R between the states of A and B such that (a) initial$_A$ R initial$_B$ (b) if s R t and there is a transition in A from s to s' labeled by a, then there exists a transition in B from t to t' labeled by a and s' R t' and (c) if s R t and s is an end state in A, then also t is an end state in B The definition for trace inclusion for two LTSs A and B over the same set alphabet of labels is given by the set inclusion Trace(A) $\subseteq$ Trace(B). The notions of bi-simulation and trace-equivalence are similarly defined.

Note however that in the definitions above, the alphabet of the two LTSs is the same, while in our case the GCM G and the composed system L have different alphabets. So, the alphabet of interactions used by G may be mapped to their corresponding send and receive events in L. How this is done is determined by the three possible viewpoints. Since these viewpoints are not explicitly addressed in the literature, we explain them via the example embodiments of FIGS. 6A-6C.

Figure 6A:
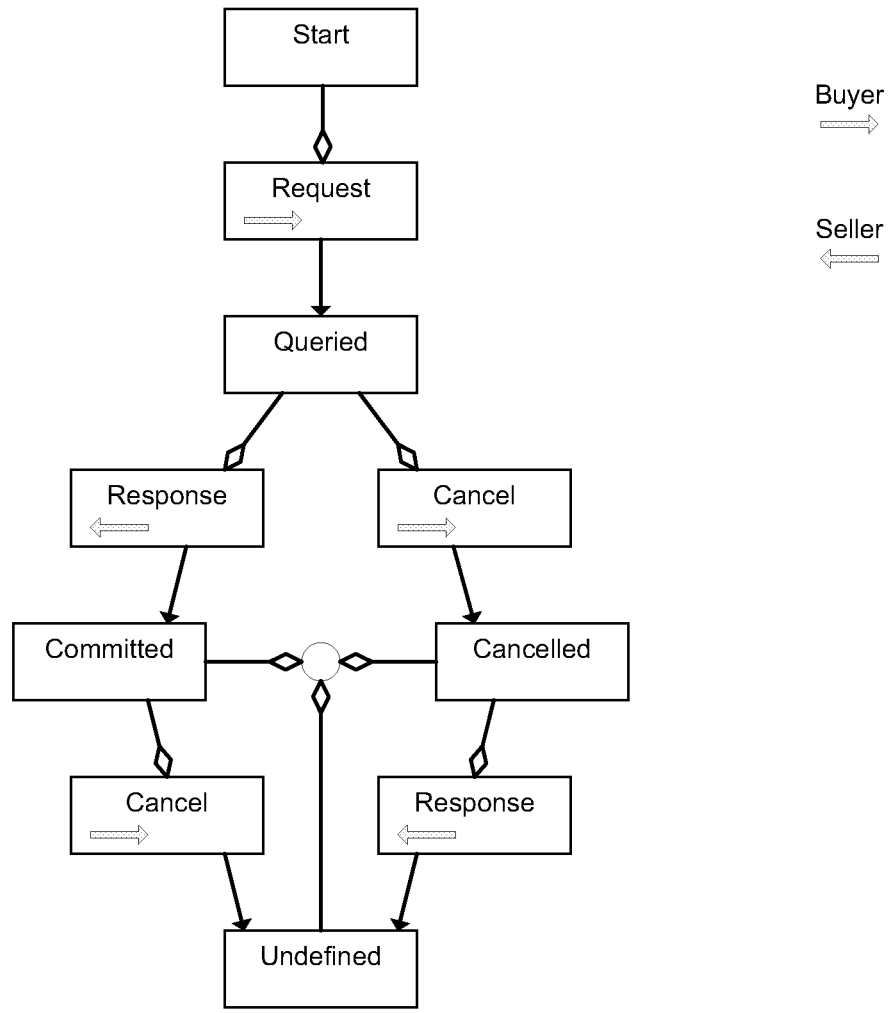
FIGS. 6A-6C are block diagrams that illustrate the three viewpoints according to embodiments of the present invention.
Figure 6B:
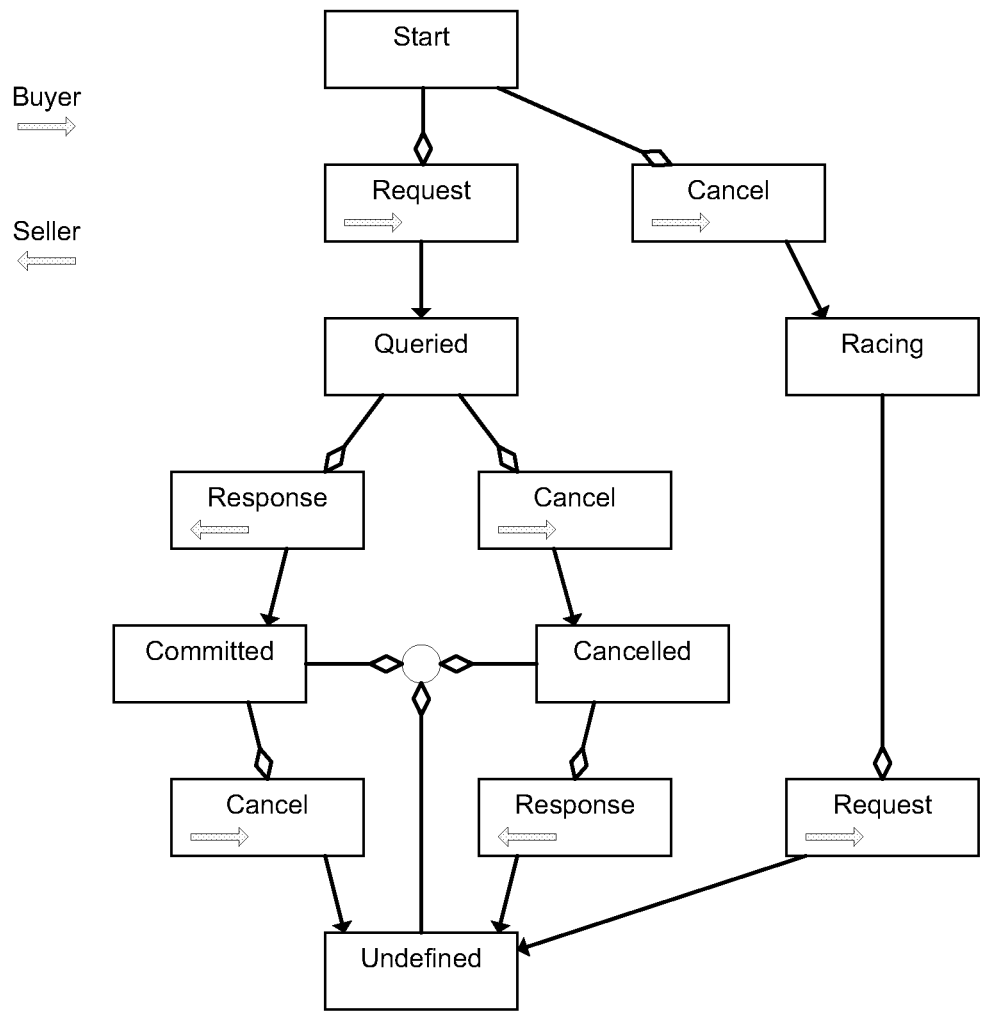
Figure 6C:
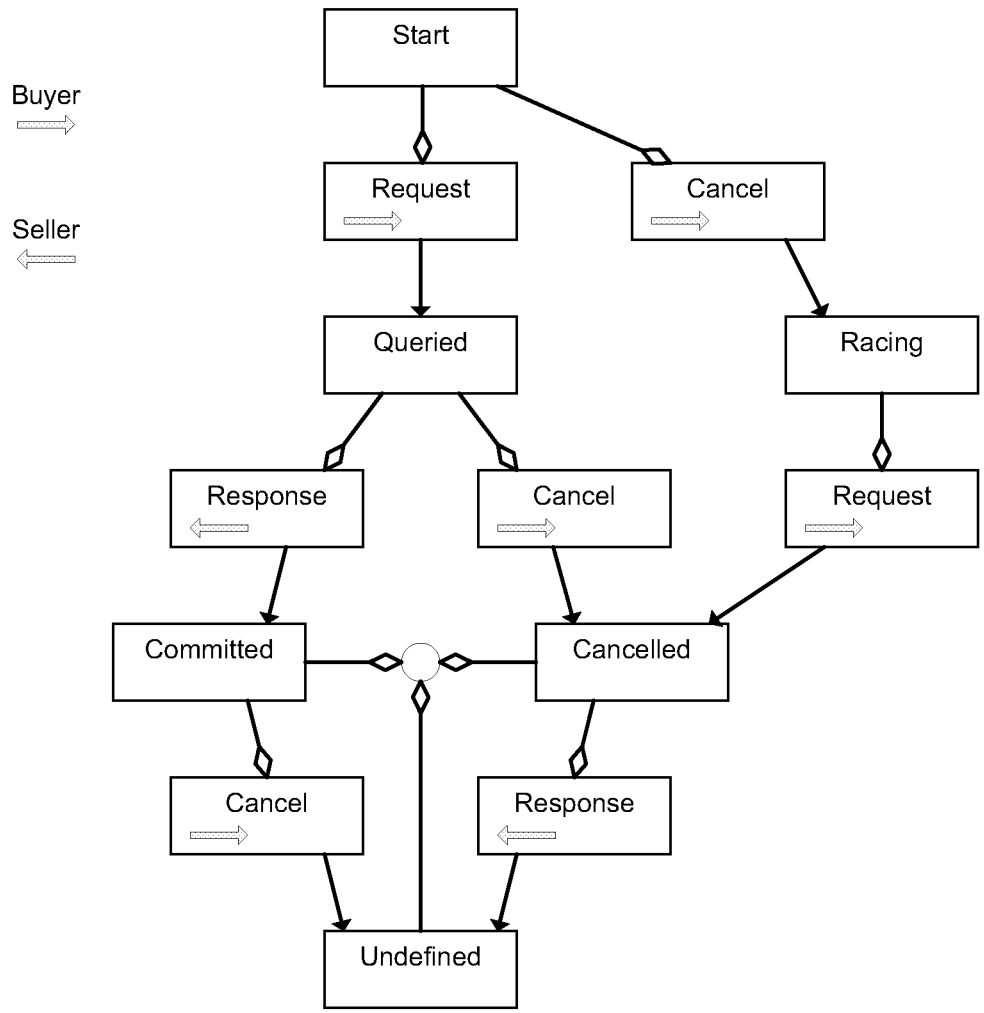

FIGS. 6A-6C are block diagrams that illustrate the three viewpoints according to embodiments of the present invention. (The blocks not explicitly described are similar to those described with reference to FIGS. 3A-3B.) For simplicity, the consistency relation is fixed to trace inclusion, and G is assumed to be an over-approximation of L. Further let MT(m) denote the message type of an interaction as well as of a send or a receive event m.

FIG. 6A shows the send viewpoint. A GCM G is a send-viewpoint of a composed system L if for each trace $(e_1, \ldots e_n)$ of L there exists a trace $(i_1, \ldots, i_k)$ of G such that if $(s_1, \ldots s_k)$ is the projection of $(e_1, \ldots e_n)$ to send events, then (MT$(i_1), \ldots,$ MT$(i_k)$)=(MT$(s_1), \ldots$ MT$(s_k)$).

The GCM of FIG. 6A is a send-viewpoint of the composed system depicted in FIGS. 4A-4B with one EO channel for all messages. The projection of Traces(L) into send events is the set:

send request→send cancel
send request→send response
send request→send cancel→send response
send request→send response→send cancel This corresponds to the traces of the considered GCM. Note that taking into account or omitting the additional dashed "EO trace" does not affect the resulting traces above. Thus the send viewpoint does not reflect message racing explicitly. Its choreography model is equal to the one describing ordered messages in FIGS. 3A-3B.

FIG. 6B shows the receive viewpoint. A GCM G is a receive-viewpoint of L if for each trace $(e_1, \ldots e_n)$ of L there exists a trace $(i_1, \ldots, i_k)$ of G such that if $(r_1, \ldots r_k)$ is the projection of $(e_1, \ldots e_n)$ to the receive events, then (MT$(i_1), \ldots,$ MT$(i_k)$)=(T$(r_1), \ldots$ MT$(r_k)$).

The GCM in FIG. 6B is a receive-viewpoint of the composed system from FIGS. 4A-4B with an EO channel, because the projection of the traces from FIG. 5 to receive events results in receive request→receive cancel
receive request→receive response
receive request→receive cancel→receive response
receive request→receive response→receive cancel
receive cancel→receive request This corresponds to the traces of the global model in FIG. 6B. If we consider an EOIO channel for all messages the dashed path is omitted and thus the last of the above receive-projected traces is excluded. Hence all the models in FIGS. 6A-6C are receive-viewpoints of the composed system with EOIO.

The receive-viewpoint thus reflects the possible loss of message order on the channel in defining all possible sequences of receive events. In our example the buyer's cancel message can possibly overtake the request message, but if received in that order the seller will not send any response.

FIG. 6C shows the observe viewpoint. We can consider an even weaker viewpoint of GCMs. Assume that we extend the traces of a composed system with an observe event, similarly to send-events and receive-events. It can occur at any position between the send-event and the receive-event of a particular message. E.g. if (send_m1, send_m2, receive_m1, receive_m2) is a composed system trace then an observe-extended trace is as follows:

{(send_m1, observe_m1, send_m2, observe_m2, receive_m2, receive_m1), (send_m1, send_m2, observe_m1, observe_m2, receive_m2, receive_m1), (send_m1, send_m2, observe_m2, observe_m1, receive_m2, receive_m1), (send_m1, send_m2, observe_m2, receive_m2, observe_m1, receive_m1)}

Similar to previous definitions, a GCM G is an observe-viewpoint of a composed system L if for each observe-extended trace $(e_1, \ldots e_n)$ of L there exists a global trace $(i_1, \ldots, i_k)$ such that if $(o_1, \ldots o_k)$ is the projection of $(e_1, \ldots e_n)$ to the observe events, then (MT$(i_1), \ldots,$ MT$(i_k)$)= (MT$(o_1), \ldots$ MT$(o_k)$).

In our example, observe cancel→observe request→observe response is an additional (observe) trace of the composed system with EO channel. The global model of FIG. 6C is thus an observe-viewpoint of the composed system in FIGS. 4A-4B, but those in FIG. 6A and FIG. 6B are not.

The presence of the additional trace is due to the fact that the there might be a point of observation where the messages cancel and request from the buyer switch their order but switch back afterwards. In this case the seller might respond to the request message before receiving the cancel.

Discussion. Existing approaches in the literature (e.g., see Section 5) implicitly assume a send-viewpoint. We found however that a send-viewpoint (though applicable) is probably misleading as it does not reflect the possibility of message order changes. The same holds for an observe-viewpoint as it describes message sequences, which the two participating partners will not observe locally. Therefore an embodiment adopts the receive-viewpoint which describes exactly those orders of receive events that are possibly observed by the partners. It thus explicitly describes which sequences have to be considered to make each partner robust against all possible re-orderings of interactions. This also is a factor to drive the test generation according to an embodiment which is directed to consider message racing.

Note that the various types of consistency relations can be reduced under certain assumptions. First, considering EOIO, the receive-viewpoint and observe-viewpoint choreographies are equal. Second, if L and G are deterministic, the (bi) simulation and trace equivalence are equal, too.

In the literature, consistency checks are done using a send-viewpoint. For instance, the local enforceability (from Decker and Weske; see above) according to an embodiment corresponds to G as an over-approximation of L based on simulation, while the realizability (from Decker and Weske; from Alur, Etessami and Yannakakis; and from Fu, Bultan and Su; see Alur, R., Etessami, K., Yannakakis, M., Realizability and verification of MSC graphs, in Theoretical Computer Science (TCS), Vol. 331 (1), pp. 97-114, Elsevier (2005); and Fu, X., Bultan, T., Su, J., Conversation Protocols: A Formalism for Specification and Verification of Reactive Electronic Services, in Theoretical Computer Science (TCS), Vol. 328 (1-2), pp. 19-37, Elsevier (2004)) according to an embodiment corresponds to a bisimulation between G and L. While an embodiment of the present invention covers these cases, further embodiments address consistency relations based on under-approximations and receive viewpoint. For instance this solves the shortcoming mentioned by Decker and Weske (see Decker, G., Weske, M., Behavioral Consistency for B2B Process Integration, in Proc. of CAiSE'07, LNCS, vol. 4495, pp. 81-95, Springer (2007)) where the authors conclude that weak bi-simulation does not support reordering of messages. Considering a receive viewpoint solves this issue.

3.6 Further Features of Message Choreography Modeling

The modeling concepts introduced above cover a large part of the choreographies we have to deal with in industrial practice. However, the concept is extensible for a couple of improvements. In practice for instance, available, pre-defined message types are not expressive enough. For instance, an interaction with a confirmation message type may either express an acceptance or a rejection and thus the communication might continue in different ways, depending on this information. Therefore it is desirable to take into account the contents of the exchanged messages as additional guards of interactions. Otherwise non-determinism would impede the test generation. An embodiment of MCM includes a message constraint language that includes first-order expressions over data type properties. For instance we refer to contents of an exchanged message msg by:

msg[PurchaseOrder.AcceptanceStatusCode]=="accepted"

expressing that the contents of the message by navigating through PurchaseOrder and AcceptanceStatusCode has a certain value that enables the interaction.

Moreover interaction guards may refer to messages exchanged in other (previous) interactions or to a global counter of messages. Therefore an embodiment includes additional variables having an assigned data type. These variables can be declared, assigned to in interactions, and referred to as guards. A further embodiment is directed toward considering the global state to be assembled of a number of parallel sub state machines. Partitioning the global state this way allows explicit concurrency modeling which can concisely reflect the inherent asynchronous nature of choreographies. FIG. 3B gives an example how the GCM can be modeled using two parallel state machines Negotiation 350 and Cancellation 352.

3.7 Local Partner Models as Views on the Global Choreography Model

As determined from developing an embodiment of the present invention, it is beneficial to restrict choreographies to exactly two partners. The remainder of the description therefore follows this assumption. When modeling LPMs (like those in FIGS. 4A-4B) for a given GCM, it becomes evident that the LPMs are structurally similar, if not equal, to the GCM: We can generate two LPMs from a global model by replacing the interactions with send-events or receive-events while replicating the global state space for each LPM. More precisely, we define a composed model C to be derived from the GCM G if there is a bijection g between the states of the LPMs of C and G as well as between the send-receive-events/interactions of the LPMs of C and G such that for each send/receive event e, its effect eff(e), and its guard guard(e):

g(e) has exactly the effect g(eff(e)) and exactly the guard g(guard(e)) (*)

Considering changes during the model's lifecycle, a generative approach has the weakness, that when the local models are altered manually, it is not enforced that C is still a derived composed model of G. As a solution, we technically consider the LPMs as "views" on the GCM. This technique enforces that C is always a derived composed model of G following the definition above.

Considering the features of Section 3.6, we may go a step further and derive composed models which impose additional inhibiting guards on status values. This weakens the relation (*) by g(e) has exactly the effect g(eff(e)) and at most the guard g(guard(e))

As determined from developing an embodiment of the present invention, the added guards always have to be send-after-receive constraints.

4. USING MCM IN THE DEVELOPMENT PROCESS

In this section we explain the development activities that involve the use of MCM models.

4.1 Initial Modeling

The aim of building the GCM is to create a description that fits all the user requirements and at the same time does not violate basic desirable properties like deadlock-freedom and local enforceability. Usually for complex interactions between services such descriptions may be created by step-wise refinement. Therefore we start with the definition of an initial GCM that might not be complete and usually considers synchronous communication for simplicity. From the GCM the editor automatically derives the LPMs (see Section 3.7). In the next step these LPMs are manually refined with local send-after-receive constraints. Finally, the channel reliability is defined for each message type (see Section 3.3).

4.2 Verification and MCM Refinement

After the initial model is built, it can be used for verification. An embodiment of the present invention uses the general purpose formal modeling language Event-B and the tool Rodin. See, e.g., M. J. Butler, C. B. Jones, Abdolbaghi Rezazadeh and Elena Troubitsyna, "RODIN Deliverable D29: Final Report on Methodology". One of the central concepts of Event-B is refinement, which covers both trace inclusion and simulation. Therefore it can be used for checking all the consistency relations from Section 3.5. An embodiment achieves this by a set of transformations from MCM to Event-B, one for each of the consistency types.

As an advanced theorem prover, Rodin offers several ways to discharge the generated proof obligations of the Event-B models, being able to address unbounded channels and complex side conditions (see Section 3.6). Properties such as the absence of inconsumable messages may also be formalized and proven as additional invariants. According to another embodiment, a model checker may be used.

However this comes with the disadvantage that some proofs are not fully automated, because of the undecidability of first order logic. Therefore an embodiment implements custom verification algorithms for checking simulation that are more efficient in some cases.

Additionally to the consistency relations we also verify properties like absence of inconsumable messages and deadlocks. An MCM has an inconsumable message m if in some composed state m is on the channel, and according to the channel model will be received next, but no guard condition of the corresponding partner is satisfied. After the analysis any detected inconsistencies between the models may be resolved. This may be done by adding constraints to the LPMs (see Section 3.7) as well as modifying the channel model (see Section 3.3).

Another way is to enhance the GCM such that additional interaction sequences become valid. This implicitly leads to enhancements of the LPMs because the missing send and receive events have to be added. Fortunately like in the initial modeling phase this is carried out automatically by the model editor according to an embodiment. Usually enhancements of the GCM and restrictions of the LPMs and channel models both are carried out in one refinement step. After each refinement, the verification will be applied again until all user requirements are modeled and the checks do not uncover issues any more.

4.3 Testing

Because the created models are too abstract to generate code automatically the implementation may be carried out manually. However during that phase, an embodiment uses the models to generate code stubs and to make the user requirements transparent to the programmers. For the consecutive integration testing however the granularity of MCM is fine enough so that model-based testing techniques can be applied.

On one side choreography models can be used by an embodiment to generate test suites that satisfy chosen coverage criteria. On the other side an embodiment may use the models as a test oracle. Both methods are may be combined in an embodiment, so that the generated test cases contain information about the expected system response that is compared against the occurring output. Additional to the test design automation, using MBT also allows test suite optimization according to an embodiment by generating minimal test suites, leading to shorter execution time and reduced maintenance effort.

An embodiment generates abstract test suites with different coverage criteria for integration testing. These abstract test suites are transformed to concrete test suites by adding test data and further to executable test scripts by providing system specific information. Both of the transformations may also be automated in an embodiment.

4.4 Example

Figure 7:
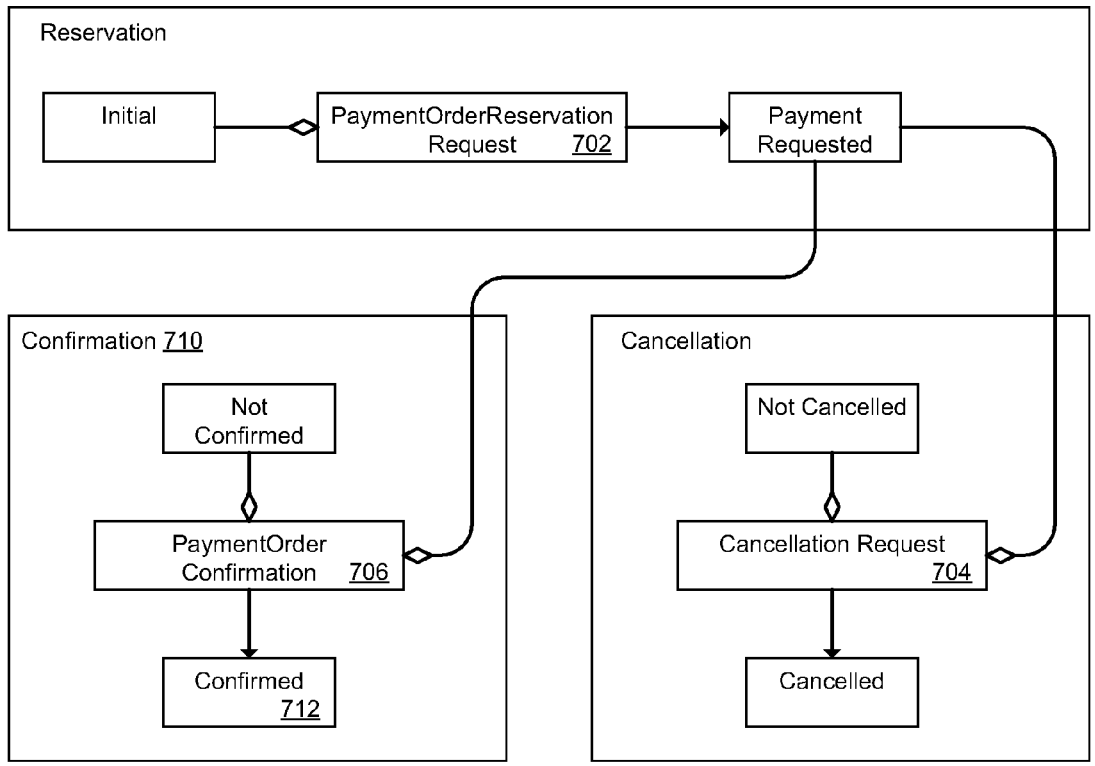
FIG. 7 is a block diagram that describes an initial meta-model according to an embodiment of the present invention.

This subsection details an example that may be implemented according to one or more embodiments of the present invention.
4.4.1. Overview
FIG. 7 is a block diagram that describes an initial meta-model according to an embodiment of the present invention. FIG. 7 introduces as a running example a simplified part of the communication between Due Item Processing (DIP) and Payment Processing (PP). First a PaymentOrderReservationRequest 702 is observed being sent from DIP to PP. Subsequently we may observe that DIP sends a CancellationRequest 704 to PP or that PP sends a PaymentOrderConfirmation 706 to DIP. Both of the latter two options may happen together since the PaymentOrderConfirmation 706 and CancellationRequest 704 can be both sent before the mutual other ones have been received.

4.4.1.1 Interactions and Effects [0124] The Interaction meta-class is a noteworthy part of the MCM meta-model. An Interaction models the exchange of one message between a sender and a receiver. Around the Interaction construct there two important parts: conditions and effects.

Conditions must hold to allow the Interaction to take place. One condition is that the exchanged message has a certain type. It is represented by the meta class DataType, representing global data types of typical message based process integration.

Other conditions are those which must hold as preconditions to the Interaction taking place. These conditions are represented by the abstract meta class Guard. See Section 4.4.1.2 for more details regarding these conditions.

Effects are produced by the Interaction. These effects are aggregated in the meta class MessageEffect. Effects include communication status values and helper variables.

The communication status values (meta class CommunicationStatusValue) are set by the Interaction. Each CommunicationStatusValue may belong to a different CommunicationStatusVariable. The concept of communication status variables is discussed in Section 4.4.2; for now simply consider them to be a partial global state of the communication.

A communication status variable may be represented as a box (e.g., Confirmation 710) containing its communication status values (e.g., Confirmed 712). The effect on the status value may be represented by an arrow 714 from the interaction to the set value.

Figure 8:
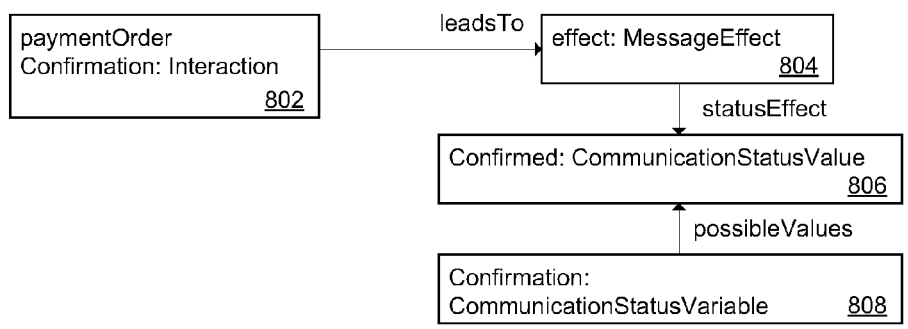
FIG. 8 is a block diagram of an effect, according to the meta model, according to an embodiment of the present invention.

FIG. 8 is a block diagram of an effect, according to the meta model, according to an embodiment of the present invention. The interaction 802 leads to the effect 804. The status of the effect is confirmed 806. The possible values of the effect result from the confirmation 808.

The helper variables may be set by the Interaction. These may be represented by the meta class VariableAssignment.

Variable assignments may have a textual representation in the concrete syntax. An embodiment uses the EBNF (extended Backus-Naur form) syntax:

| | | |
|---|---|---|
| VariableAssignment::= | Var := Expr | for a helper variable with name Var |

An example of a variable assignment in the context of PaymentOrderReservationRequest is:
requestCount:=requestCount+1
In an embodiment, the textual elements of an interaction may be displayed as properties (in the properties pane) of the interaction graphical model element.

Figure 9:
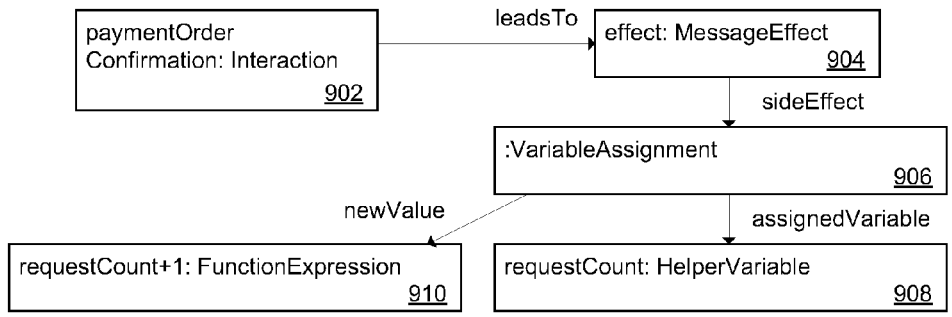
FIG. 9 is a block diagram of a helper variable, according to the meta model, according to an embodiment of the present invention.

FIG. 9 is a block diagram of a helper variable, according to the meta model, according to an embodiment of the present invention. The interaction 902 leads to the effect 904. The VariableAssignment 906 is a side effect of the effect 904. The HelperVariable 908 assigns the variable requestCount. The FunctionExpression 910 assigns the variable the new value of requestCount+1.

Section 4.4.1.3 on Expressions describes how requestCount+1 is composed from the function "+" and the variable expression "requestCount".

Similar to Interaction, EndStates include a combination of Guards. This allows us to define the choreography to be finalized under the condition that a certain combination of communication status values (or even helper variables) is reached.

The Effect (represented by the meta-class MessageEffect) produced by the Interaction sets a communication status variable and may assign values to helper variables. We refer to the former by the term status effect (represented by the meta-role name statuseffect) and to the latter by the term side effects (meta-role name sideeffect).

Status effects (see FIG. 8) are described by referring to a set of communication status values each corresponding to a different communication status variable. Each communication status variable is set to the corresponding communication status value.

Side effects (see FIG. 9) are described by a sequence of variable assignments (each represented by the meta-class VariableAssignment). Each assignment includes the helper variable to be set as well as its new value that is determined by an expression. For the concept of expressions see Section 4.4.1.3 below.

4.4.1.2 Conditions

Figure 10:
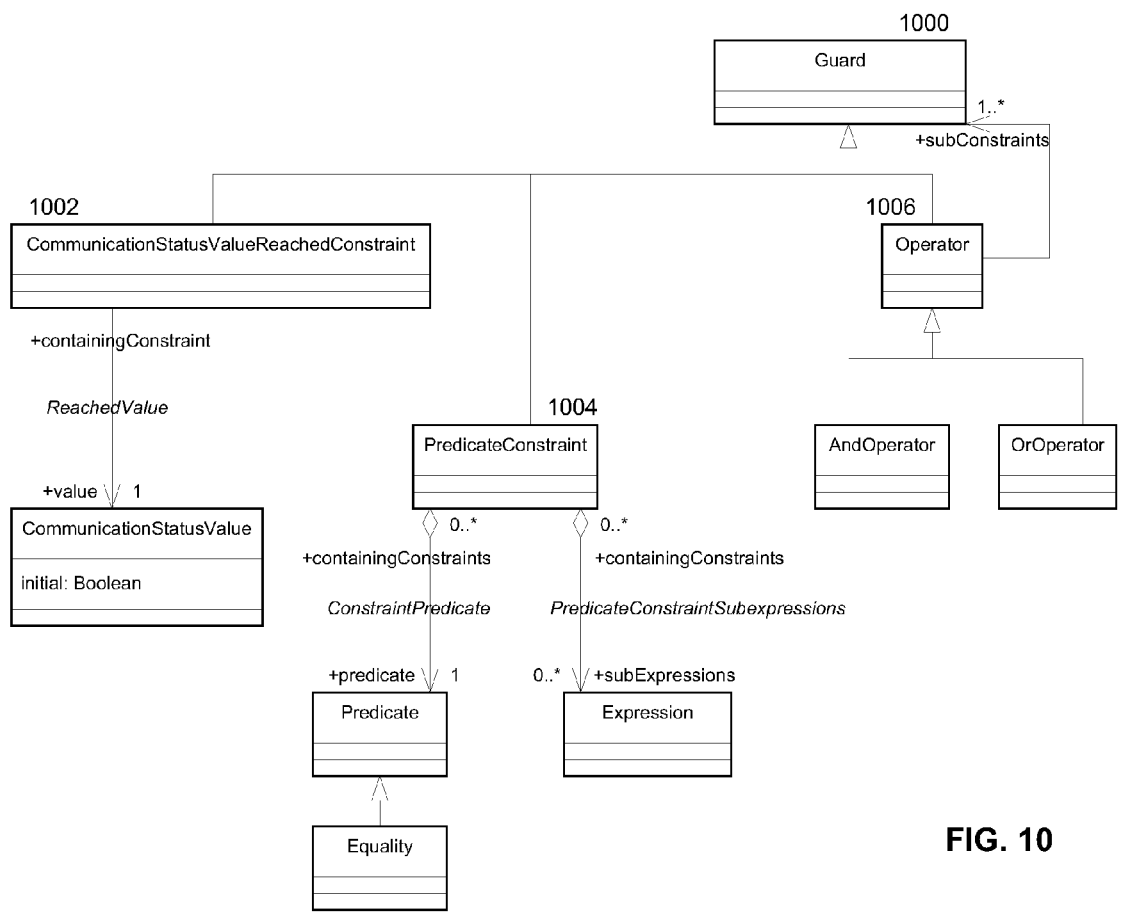
FIG. 10 is a block diagram that shows conditions according to an embodiment of the present invention.

FIG. 10 is a block diagram that shows conditions according to an embodiment of the present invention. Conditions other than the message type are grounded in constraints represented as the Guard meta-class 1000. There are three major kinds of guards which can be distinguished:

1. The constraint that a certain communication status value is reached. This may represented as meta-class CommunicationStatusValueReachedConstraint 1002.

2. Other atomic constraints, such as predicates on helper variables, e.g. x==3, x<3, x<y+1, etc. This may be represented as meta-class PredicateConstraint 1004.

3. Combinations of other constraints conjoined with logical operators such as and or or. This may be represented as the Operator meta-class 1006.

The condition describing that a message must be of a certain message type may be treated separately in order to ensure that at least one message type is assigned to a transition. In certain embodiments it may not be needed to assign more than one message type to one transition so a multiplicity of 1 may be set.

The CommunicationStatusvalueReachedConstraints may be depicted as a line with a diamond at the end of the interaction box (note the line into 702 in FIG. 7). This expresses that the communication status value Initial must be reached before PaymentOrderReservation Request 702 (see FIG. 7) can be observed.

Figure 11:
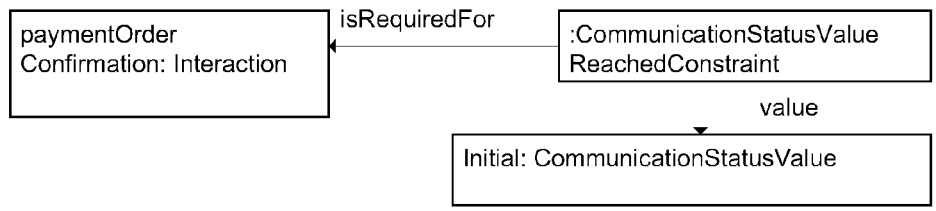
FIG. 11 is a block diagram that shows the CommunicationStatusValueReachedConstraints piece of the model that is represented as instance of the meta model according to an embodiment of the present invention.

FIG. 11 is a block diagram that shows the CommunicationStatusValueReachedConstraints piece of the model that is represented as instance of the meta model according to an embodiment of the present invention.

Currently, we mostly expect conjunctively conjoined preconditions, as in the example of FIG. 7, PaymentOrderConfirmation 706 requires NotConfirmed and PaymentRequested to be reached.

Moreover the meta-model allows for pre-conditions which express properties of the context of a message such as
    msg[PaymentOrder.PaymentExecutionStatus]==1
which expresses that the entry PaymentOrder.PaymentExecutionStatus in the message referenced by variable msg, which is the message exchanged in the focused interaction, must have the value 1 in order to allow the interaction to take place.

Figure 12:
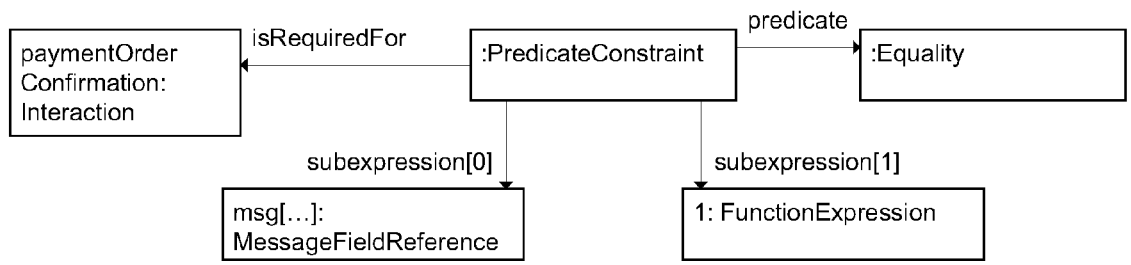
FIG. 12 is a block diagram expressed in terms of a meta model instance according to an embodiment of the present invention.

FIG. 12 is a block diagram expressed in terms of a meta model instance according to an embodiment of the present invention. FIG. 12 shows that the above example constraint is an instance of the class PredicateConstraint 1202. Note that MessageFieldReference 1204 and FunctionExpression 1206 are subclasses of Expression (compare to FIG. 10), which is explained below.

4.4.1.3 Expressions

Figure 13:
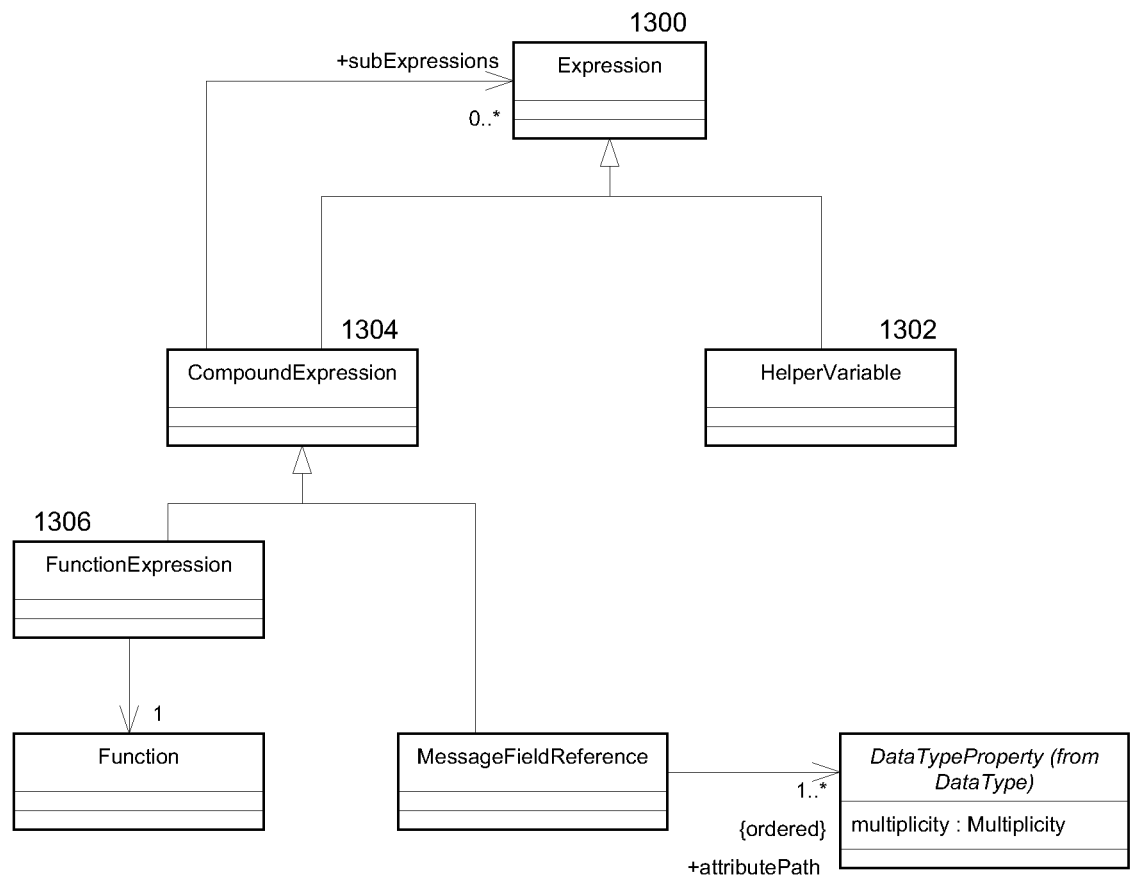
FIG. 13 is a block diagram of the abstract meta-class Expression according to an embodiment of the present invention.

FIG. 13 is a block diagram of the abstract meta-class Expression 1300 according to an embodiment of the present invention. Predicate constraints contain expressions, such as 3 or requestCount+1, that may be represented by the abstract meta-class Expression 1300.

In the concrete syntax, expressions may be represented in a textual way. The grammar of expressions in an EBNF is shown in the following paragraphs.

Atomic concrete expressions are helper variables (meta-class HelperVariable 1302). An example sub-expression from the expression requestCount+1 which is a helper variable is requestCount (compare with FIG. 9). According to an embodiment, they cannot contain any sub-expressions themselves.

Expressions which potentially contain sub-expressions are represented by the abstract meta-class CompoundExpression 1304. Compound expressions can be functional expressions (meta-class FunctionExpression 1306) as e.g. requestCount+1, referring to a function (here: +). Functional expressions can also degenerate to expressions without sub-expressions such as constants (e.g. 1).

In the concrete syntax according to an embodiment the following EBNF may be applied for FunctionExpressions:

$$\text{Expr} ::= (\text{Expr} + \text{Expr}) \mid (\text{Expr} - \text{Expr}) \mid \ldots \mid [0..9]^+$$

and similar for other needed operators other than + or −.

Figure 14:
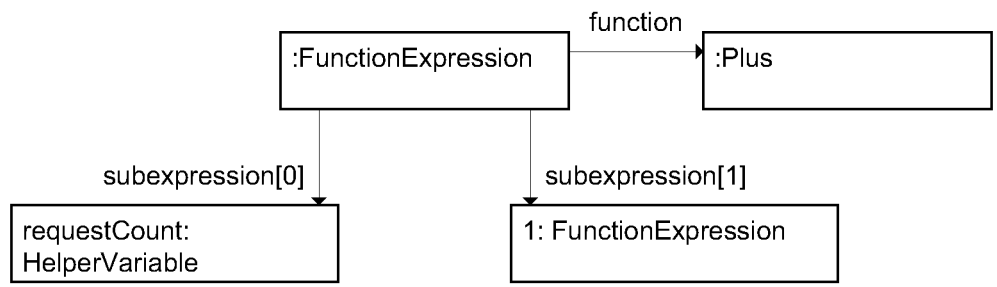
FIG. 14 is a block diagram showing the FunctionExpression requestCount+1 represented as a meta model instance according to an embodiment of the present invention.

FIG. 14 is a block diagram showing the FunctionExpression requestCount+1 represented as a meta model instance according to an embodiment of the present invention.

Figure 15:
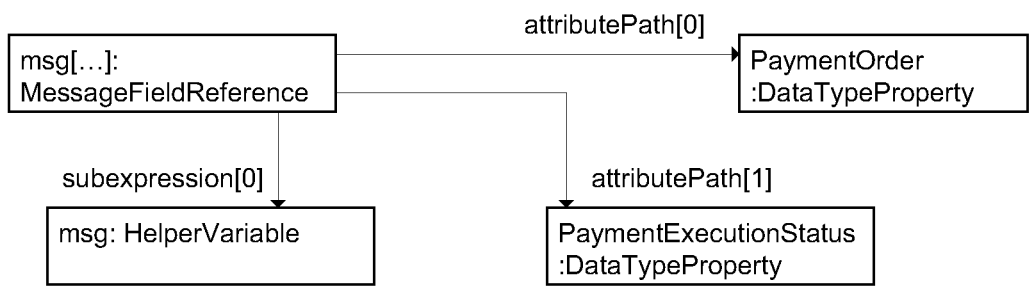
FIG. 15 is a block diagram showing a MessageFieldReference according to an embodiment of the present invention.

FIG. 15 is a block diagram showing a MessageFieldReference according to an embodiment of the present invention. MessageFieldReferences are another way for compound expressions to constrain entries in a message. MessageFieldReferences may include an (ordered) sequence of elements, describing a path to an entry in a message. That target meta-class may represent messages (see Section 4.4.3). Message field references may have exactly one sub-expression, namely the one that describes the message in which the specified path is looked up. If, for example, msg is a helper variable pointing to a certain message, then msg[PaymentOrder.PaymentExecutionStatus] describes the entry reached by following the path PaymentOrder.PaymentExecutionStatus in that message.

According to an embodiment, XPath may be integrated. How references to message elements look like both in concrete syntax and in meta model may be modified in such an embodiment. See technical report: XML Path Language (XPath) 2.0 W3C Recommendation.

According to an embodiment, one dedicated helper variable may be used to describe the message which is exchanged at the "current" interaction. In FIG. 15 this variable is called msg.

4.4.2 Design Decisions

In this section we document the major design decisions met to achieve the meta-model as described above according to an embodiment of the present invention.

4.4.2.1 Status Variables vs. State

Traditional (finite) state machines are equipped with the notion of a state as explicit meta-class. The meta-model according to an embodiment provides for a set of status variables instead.

The intention behind a set of status variables is to model concurrency explicitly. This is done by devoting one status variable to each concurrent "thread" of execution. A status variable represents a partial state, whereas the cross product of all status variable values gives the state space.

According to an embodiment, one way to simulate traditional state machines with a multi-status-variables approach is by making the modeling tool create only one status variable corresponding to the state machine's state.

4.4.2.2 Distinction Between Communication Status and Helper Variables

According to an embodiment, the effects produced by an interaction may be split up into two parts: changes to the communication status and changes to helper variables. Technically there is no need to distinguish between these two effects; both are just changes to the overall system state. Nevertheless we found it advantageous to separate them for the following reasons:

- We want to impose the constraint that there is exactly one communication status change per interaction but arbitrarily many side effects. With the distinction, this constraint is immediately visible in the meta-model structure, whereas without distinction we would have to specify an OCL (Object Constraint Language) constraint on the meta-model.
- For model-based testing and the accompanying test coverage criteria, an explicit representation of state (as a combination of communication status variables) is desirable. For some (state) coverage criteria, only these communication status would be needed to consider, and thus only a finite state space.
- There might be use cases where one is not interested in conditions and assignments on helper variables. In that case and with the distinction, it is algorithmically easier to "drop" the helper variables.

4.4.2.3 No Distinction Between Pre-Conditions and Source Status(es)

In contrast to the decision to distinguish between effects on the communication status and on the additional variables, an embodiment does not sharply distinguish between the different kinds of expressions:

1. The constraint that a certain communication status value is reached.
2. Other atomic constraints, such as predicates on helper variables.

In contrast to Section 4.4.2.2, there can be more than one communication status which is relevant as pre-condition for an interaction. Moreover there might be logical combinations taking into account communication status conditions and conditions on helper variables. Finally the obtained meta-model structure is clearer.

4.4.2.4 End-States as Combination of Guards

An end-state of the choreography can—in general—be determined by any logical combination of communication status values. Thus an end-state may be modeled as an explicit model entity which is treated like a Guard. It has, in contrast to that class, though only required connections to conditions, such as predicates indicating that a certain communication status has been reached.

Alternatively, an "end" flag could may be assigned to each communication status value according to an embodiment. If all end-status are reached the whole choreography may end. This alternative may be less powerful.

4.4.3 Concrete Example in the Suggested Notation

As discussed above, FIGS. 3A-3B provide an example choreography according to an embodiment of the present invention. The example includes two communication status variables Negotiation 350, and Cancellation 352. The example includes five communication status values 316, 318, 322, and 324 (FIG. 3A, or 325 in FIG. 3B). The example includes three interactions 310, 312, and 314. The functionality of the example operates according to similar functionality described above, and (for brevity) is not repeated.

FIG. 16 is a block diagram of an example computer system and network 1400 for implementing embodiments of the present invention. Computer system 1410 includes a bus 1405 or other communication mechanism for communicating information, and a processor 1401 coupled with bus 1405 for processing information. Computer system 1410 also includes a memory 1402 coupled to bus 1405 for storing information and instructions to be executed by processor 1401, including information and instructions for performing the techniques described above. This memory may also be used for storing temporary variables or other intermediate information during execution of instructions to be executed by processor 1401. Possible implementations of this memory may be, but are not limited to, random access memory (RAM), read only memory (ROM), or both. A storage device 1403 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 1403 may include source code, binary code, or software files for performing the techniques or embodying the constructs above, for example.

Computer system 1410 may be coupled via bus 1405 to a display 1412, such as a cathode ray tube (CRT) or liquid crystal display (LCD), for displaying information to a computer user. An input device 1411 such as a keyboard and/or mouse is coupled to bus 1405 for communicating information and command selections from the user to processor 1401. The combination of these components allows the user to communicate with the system. In some systems, bus 1405 may be divided into multiple specialized buses.

Computer system 1410 also includes a network interface 1404 coupled with bus 1405. Network interface 1404 may provide two-way data communication between computer system 1410 and the local network 1420. The network interface 1404 may be a digital subscriber line (DSL) or a modem to provide data communication connection over a telephone line, for example. Another example of the network interface is a local area network (LAN) card to provide a data communication connection to a compatible LAN. Wireless links is also another example. In any such implementation, network interface 1404 sends and receives electrical, electromagnetic, or optical signals that carry digital data streams representing various types of information.

Computer system 1410 can send and receive information, including messages or other interface actions, through the network interface 1404 to an Intranet or the Internet 1430. In the Internet example, software components or services may reside on multiple different computer systems 1410 or servers 1431, 1432, 1433, 1434 and 1435 across the network. A server 1431 may transmit actions or messages from one component, through Internet 1430, local network 1420, and network interface 1404 to a component on computer system 1410.

The computer system and network 1400 may be configured in a client server manner. The client 1415 may include components similar to those of the computer system 1410.

As an example embodiment, the computer system and network 1400 may implement the MCM in a client server environment. The client server environment may be a Java™ enterprise environment such as J2EE, or another type of environment such as the Microsoft™ .NET environment. The computer system 1410 may implement the server and the client 1415 may implement the client. The processor 1401 may implement the processor system 104 (see FIG. 1A). The storage device 1403 may implement the storage system 102 (see FIG. 1A). The computer program 110 (see FIG. 1B) may be stored on the storage device 1403. The user interface 114 (see FIG. 1B) may be executed by the client 1415.

5. RELATED WORK

Several choreography modeling languages have emerged in the last few years. They vary in several regards such as abstraction level, formal grounding, target users, etc. In this section we compare some of the most prominent languages namely WS-CDL, BPMN, BPEL4Chor and Let's Dance, and compare them to MCM according to an embodiment of the present invention.

As discussed above, WS-CDL is a XML-based textual modeling approach for service choreographies with various artifacts. BPMN can describe guided interaction between service components (service orchestration), i.e. the message exchange is expected to be controlled by an uninvolved third party. Let's Dance is a choreography modeling approach that targets a high level specification of a message exchange.

Regarding WS-CDL, the lack of a graphical syntax makes it inapplicable for our target users. It also misses the explicit notion of termination, which is a desirable ingredient driving automatic test generation as discussed in Section 3.1. Termination can only be modeled by having no further possibility to send any message and hence the final states Committed and Cancelled (see FIGS. 3A-3B) cannot be modeled in WS-CDL without leading to non-determinism. WS-CDL further assumes a global send viewpoint and hence does not reflect message racing directly.

Regarding BPMN, BPEL4Chor and Let's Dance, although the core of these languages is formal, guards and conditions are defined in natural language, which makes them inappropriate for verification or automatic testing approaches. Like WS-CDL they do not have an explicit notion of termination. Due to the assumed send viewpoint they are not able to visualize message racing. Additionally Let's Dance does not support the modeling of partner views.

Also classical modeling constructs have been proposed for choreography modeling: Petri-nets, message sequence charts and communicating state machines. Like BPMN, BPEL4Chor and Let's Dance they are able to specify either global or stitched local choreography models but not both as is the case of MCM, which works on a single metamodel for both. Moreover the semantics of these languages would have to be refined (e.g. viewpoints, termination, determinism enforcement, channel restrictions) to suit our purpose. Further implementation of a supporting tool infrastructure would be necessary. Therefore it seems more appropriate to use a domain specific language like MCM that fully fits the intended use and further allows all kinds of customization that established languages may not.

6. CONCLUSION

An embodiment includes a choreography modeling approach called MCM that fulfills the requirements SOA poses on choreography modeling in an ERP software development context, e.g. a detailed channel model, connected global and partner models, a well-defined viewpoint for the global model and the availability of termination symbols. Current approaches do not tackle all of these concerns simultaneously. An embodiment includes a variety of options for interpreting global choreography models and for defining consistency with local models, which have not before been addressed in the literature. Further according to an embodiment an unambiguous model as MCM leads to higher quality by supporting design, verification and testing of service collaboration which until now was possible only by using diverse models. Since in MCM verification and testing are based on the same model in an embodiment, inaccurate specifications (due to behavior omission or addition) can be detected and adjusted in a very early design stage, at the same time reducing the modeling effort.

The MCM editor according to an embodiment implements a detailed specification of the communication channels and the global choreography. Therefore it is able to provide automatic checks for unspecified effects of race conditions or infeasibility to deploy the choreography locally (i.e., realizability and local enforceability).

The MCM editor according to an embodiment implements defining independent status variables. This enables true concurrency and hence explicit separation of parallel streams of interactions, instead of interleaving or coordinated process splitting using parallel operators.

The MCM editor according to an embodiment implements using a shared meta-model as the base of the local and global view, thus allowing to consistently switch between global and local views of the choreography.

The MCM editor according to an embodiment implements using a shared meta-model as the base of the local and global view, thus enabling to mask an interaction event of the global view as send or receive event in the local view. This preserves the autonomy of the individual interactions and thus achieves a global model view that is a less cluttered representation of each observable message sequence, while the local views display exactly the send and receive events of their local behavior required to enforce the choreography.

The MCM editor according to an embodiment implements the local views of the choreography in synch with the global model, thus the compatibility between the local behaviors and the channels is checked by construction.

The MCM editor according to an embodiment works together with the integrated verification and test derivation plugins. According to evaluation performed on an embodiment, a real seller-buyer choreography modeled together with the integration architects includes about 20 concurrent interactions each with complex guard conditions. For the verification of trace inclusion more than 300 proof obligations are generated and resolved by Rodin. For testing a test suite of 12 abstract test cases were generated, with an average of 8 test steps covering 64 global transitions of the composed system.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method of evaluating interactions between processes, comprising:
    storing a message choreography meta-model that includes an interaction meta-class and a constraint meta-class, wherein the interaction meta-class relates to an exchange of a message between a sender and a receiver, and wherein the constraint meta-class relates to an input to the interaction meta-class and includes a first-order expression over a data type property;
    executing a user interface computer program with which a user creates a message choreography model between a first process and a second process, wherein the message choreography model is based on the message choreography meta-model, wherein the message choreography model includes a plurality of interactions that conform to the interaction meta-class, and wherein message choreography model includes a plurality of constraints that conform to the constraint meta-class; and
    executing a verification computer program that performs a verification of the message choreography model by evaluating the plurality of interactions and the plurality of constraints, wherein the verification includes verifying absence of an inconsumable message, wherein the inconsumable message exists if no guard condition of a corresponding partner state is satisfied.

2. The computer-implemented method of claim 1, further comprising:
    executing a testing computer program that performs a testing based on the message choreography model, wherein the testing performs model based testing on an existing implementation of the message choreography model by executing a test case that the testing computer program generates from the message choreography model.

3. The computer-implemented method of claim 1, wherein the step of executing the user interface computer program comprises:
    defining a global choreography model; and
    refining a plurality of local partner models, generated from the global choreography model, according to a plurality of send-after-receive constraints.

4. The computer-implemented method of claim 1, wherein the step of executing the verification computer program comprises:
    transforming, according to a plurality of consistency relations, the message choreography model into a general purpose model according to a general purpose modeling language; and
    evaluating the general purpose model using at least one of an advanced theorem prover and a model checker.

5. The computer-implemented method of claim 1, wherein the message choreography model includes a global choreography model, a local partner model, and a channel model.

6. The computer-implemented method of claim 1, wherein the message choreography model includes a communication status variable, a communication status value, and an interaction.

7. The computer-implemented method of claim 1, wherein the interaction meta-class includes a message type, a sender and a receiver, an effect, and a guard condition.

8. The computer-implemented method of claim 1, wherein the constraint meta-class includes a communication status value reached constraint meta-class, a predicate constraint meta-class, and an operator meta-class.

9. A computer program, embodied on a tangible non-transitory recording medium, for evaluating interactions between processes, comprising:
    data representing a message choreography meta-model that includes an interaction meta-class and a constraint meta-class, wherein the interaction meta-class relates to an exchange of a message between a sender and a receiver, and wherein the constraint meta-class relates to an input to the interaction meta-class and includes a first-order expression over a data type property;
    a user interface computer program with which a user, using a physical computing device, creates a message choreography model between a first process and a second process, wherein the message choreography model is based on the message choreography meta-model, wherein the message choreography model includes a plurality of interactions that conform to the interaction meta-class, and wherein message choreography model includes a plurality of constraints that conform to the constraint meta-class; and
    a verification computer program that, when executed by the physical computing device, performs a verification of the message choreography model by evaluating the plurality of interactions and the plurality of constraints, wherein the verification includes verifying absence of an inconsumable message, wherein the inconsumable message exists if no guard condition of a corresponding partner state is satisfied.

10. The computer program of claim 9, further comprising:
    a testing computer program that performs a testing based on the message choreography model, wherein the testing performs model based testing on an existing implementation of the message choreography model by executing a test case that the testing computer program generates from the message choreography model.

11. The computer program of claim 9, wherein the user uses the user interface computer program to define a global choreography model, and wherein the user uses the user interface computer program to refine a plurality of local partner models, generated from the global choreography model, according to a plurality of send-after-receive constraints.

12. The computer program of claim 9, wherein the verification computer program, when executed by the physical computing device:
    transforms, according to a plurality of consistency relations, the message choreography model into a general purpose model according to a general purpose modeling language; and
    evaluates the general purpose model using at least one of an advanced theorem prover and a model checker.

13. The computer program of claim 9, wherein the message choreography model includes a global choreography model, a local partner model, and a channel model.

14. The computer program of claim 9, wherein the message choreography model includes a communication status variable, a communication status value, and an interaction.

15. The computer program of claim 9, wherein the interaction meta-class includes a message type, a sender and a receiver, an effect, and a guard condition.

16. The computer program of claim 9, wherein the constraint meta-class includes a communication status value reached constraint meta-class, a predicate constraint meta-class, and an operator meta-class.

17. A system for evaluating interactions between processes, comprising:
- a storage system that stores a message choreography meta-model that includes an interaction meta-class and a constraint meta-class, wherein the interaction meta-class relates to an exchange of a message between a sender and a receiver, and wherein the constraint meta-class relates to an input to the interaction meta-class and includes a first-order expression over a data type property; and
- a processor system that executes a user interface computer program with which a user creates a message choreography model between a first process and a second process, wherein the message choreography model is based on the message choreography meta-model, wherein the message choreography model includes a plurality of interactions that conform to the interaction meta-class, and wherein message choreography model includes a plurality of constraints that conform to the constraint meta-class,
- wherein the processor system executes a verification computer program that performs a verification of the message choreography model by evaluating the plurality of interactions and the plurality of constraints, wherein the verification includes verifying absence of an inconsumable message, wherein the inconsumable message exists if no guard condition of a corresponding partner state is satisfied.

18. The system of claim 17, wherein the processor system executes a testing computer program that performs a testing based on the message choreography model, wherein the testing performs model based testing on an existing implementation of the message choreography model by executing a test case that the testing computer program generates from the message choreography model.

19. The system of claim 17, wherein the user uses the user interface computer program to define a global choreography model, and wherein the user uses the user interface computer program to refine a plurality of local partner models, generated from the global choreography model, according to a plurality of send-after-receive constraints.

20. The system of claim 17, wherein the verification computer program, when executed by the processor system:
- transforms, according to a plurality of consistency relations, the message choreography model into a general purpose model according to a general purpose modeling language; and
- evaluates the general purpose model using at least one of an advanced theorem prover and a model checker.

* * * * *